US009286403B2

(12) United States Patent
Papa et al.

(10) Patent No.: US 9,286,403 B2
(45) Date of Patent: Mar. 15, 2016

(54) COMPUTER-GUIDED CORPORATE GOVERNANCE WITH DOCUMENT GENERATION AND EXECUTION

(71) Applicant: Shoobx, Inc., Cambridge, MA (US)

(72) Inventors: Steven Paul Papa, Windham, NH (US); Jason M Furtado, Boston, MA (US); Stephan Richter, Maynard, MA (US)

(73) Assignee: Shoobx, Inc., Boston, MA (US)

( * ) Notice: Subject to any disclaimer, the term of this patent is extended or adjusted under 35 U.S.C. 154(b) by 0 days.

(21) Appl. No.: 14/614,227

(22) Filed: Feb. 4, 2015

(65) Prior Publication Data

US 2015/0220649 A1 Aug. 6, 2015

Related U.S. Application Data

(60) Provisional application No. 61/935,548, filed on Feb. 4, 2014, provisional application No. 62/024,434, filed on Jul. 14, 2014.

(51) Int. Cl.
*G06F 17/30* (2006.01)

(52) U.S. Cl.
CPC .... *G06F 17/30867* (2013.01); *G06F 17/30091* (2013.01)

(58) Field of Classification Search
CPC ............ G06F 17/30011; G06F 3/0482; G06F 15/17306; G06F 17/3089; G06F 3/0481; G06F 17/30699; G06F 21/00
See application file for complete search history.

(56) References Cited

U.S. PATENT DOCUMENTS

| | | | |
|---|---|---|---|
| 6,944,648 B2 | 9/2005 | Cochran et al. |
| 8,239,496 B2 | 8/2012 | Peterson et al. |
| 8,515,794 B2 | 8/2013 | Duparc et al. |
| 8,516,540 B2 | 8/2013 | Lerner et al. |
| 8,522,306 B2 | 8/2013 | Lerner et al. |
| 8,589,263 B2 | 11/2013 | Doenig et al. |
| 8,655,961 B2 | 2/2014 | McCabe et al. |
| 8,838,980 B2 | 9/2014 | Gonser et al. |
| 8,910,258 B2 | 12/2014 | Gonser et al. |

(Continued)

FOREIGN PATENT DOCUMENTS

EP 2228722 B1 9/2010

OTHER PUBLICATIONS

Workflow Engine, Wikipedia, the free encyclopedia (revision of Sep. 30, 2013, retrieved Sep. 18, 2015, 7:38 PM), https://en.wikipedia.org/w/index.php?title=Workflow_engine&oldid=575135668.

(Continued)

*Primary Examiner* — Angelica Ruiz
(74) *Attorney, Agent, or Firm* — Michael Y. Saji

(57) ABSTRACT

A system for corporate governance and for organizing, managing, and reporting data relating to a corporate entity is described. A database is configured to store a core record with a document record. A business logic module, coupled to the database, uses instructions in a document template for generating a document based on the core record, the core record further comprising a value reflecting human-readable information to be incorporated into the generated document, the core record further comprising a provenance of the value for allowing the business logic module to assess validity of the value at a given time by evaluating where the value was originated, the business logic module thereby enabling the system to verifiably generate documents that reflect a present state of the corporate entity.

19 Claims, 19 Drawing Sheets

(56) References Cited

U.S. PATENT DOCUMENTS

| | | |
|---|---|---|
| 2003/0069735 A1 | 4/2003 | Butler et al. |
| 2004/0015514 A1* | 1/2004 | Melton et al. ............. 707/103 R |
| 2007/0162308 A1* | 7/2007 | Peters ............................... 705/2 |
| 2007/0208734 A1* | 9/2007 | Koide et al. ........................ 707/5 |
| 2007/0208745 A1* | 9/2007 | Ture et al. .......................... 707/9 |
| 2008/0005667 A1 | 1/2008 | Dias et al. |
| 2008/0040388 A1 | 2/2008 | Petri et al. |
| 2008/0046462 A1* | 2/2008 | Kaufman et al. ............. 707/102 |
| 2008/0209313 A1 | 8/2008 | Gonser |
| 2009/0024912 A1 | 1/2009 | McCabe et al. |
| 2009/0144186 A1 | 6/2009 | Debarre |
| 2011/0106676 A1 | 5/2011 | Levi et al. |
| 2011/0276875 A1 | 11/2011 | McCabe et al. |
| 2012/0137367 A1* | 5/2012 | Dupont et al. ................... 726/25 |
| 2012/0284591 A1 | 11/2012 | Seed et al. |
| 2012/0290986 A1 | 11/2012 | Zingale et al. |
| 2013/0019156 A1 | 1/2013 | Gonser et al. |
| 2013/0050512 A1 | 2/2013 | Gonser et al. |
| 2013/0254111 A1 | 9/2013 | Gonser et al. |
| 2013/0263283 A1 | 10/2013 | Peterson et al. |
| 2014/0164542 A1 | 6/2014 | McCabe et al. |
| 2014/0250491 A1 | 9/2014 | Fleischman et al. |
| 2014/0304518 A1 | 10/2014 | Gonser et al. |

OTHER PUBLICATIONS

Christopher Null, E-signatures: The complete guide to paperless signing, PC World (Feb. 23, 2015, 11:12 AM), http://www.pcworld.com/article/2035744/e-signatures-the-complete-guide-to-paperless-signing.html.

Craid Le Clair, Alex Cullen, Julian Keenan, The Forrester Wave: E-Signatures, Q2 2013, 1-16 (Apr. 29, 2013), http://resources.idgenterprise.com/original/AST-0093400_7f84647a-6c86-4aae-af2e-b80ef4cea578_The_Forrester_Wave_eSignature_Final_2013.04.29.pdf.

Drew Ashlock, Electronic Signature FAQ, DocuSign, (Feb. 13, 2015, 11:10AM), https://www.docusign.com/electronic-signature.

Adobe EchoSign White Paper, Adobe Systems (Feb. 23, 2015), https://www.echosign.adobe.com/content/dam/echosign/docs/pdfs/EchoSign_eSig101_Nov_2011.pdf.

* cited by examiner

 Shoobx: Report Card 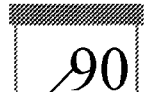 90

1902 — Title: NDA for John Doe
Template: Non-Disclosure Agreement (NDA)

Confidence Indicator 1904

1906 — Action Audit

| Date | Action | Role | Stakeholder (IP Address) |
|---|---|---|---|
| 1/1/14 2:16 PM | Created | System | John Doe, jdoe@shoobx.com (127.0.0.1) |
| 1/1/14 2:16 PM | Signed | Associate | John Doe, jdoe@shoobx.com (127.0.0.1) |
| 1/1/14 2:16 PM | Signed | Manager | John Doe, jdoe@shoobx.com (127.0.0.1) |

1908 — Document Term Summary

*Miscellaneous*

| Term | Fixed Term<br>*Company Standard* |
|---|---:|
| Term of Agreement | one (1) year<br>*Company Standard* |

1910 — Key Data Information

1910a — *Non Disclosure Agreement (NDA)*

| Field Name | Value | Value Source |
|---|---|---|
| Discloser | Stephan Richter | Manual entry. |
| Discloser Full Name | Stephan Richter | Provided by "John Doe". |
| Representative | Stephan Richter | Provided by system. |
| Representative Full Name | Stephan Richter | Provided by "John Doe". |
| Representative Position | Software Engineer | Provided by "John Doe". |
| Effective Date | 1/1/14 | Set by system. |

1910b — *Entity Corporate Information*

| Field Name | Value | Value Source |
|---|---|---|
| Entity Incorporation Date | 10/21/13 | Defined in "Certificate of Incorporation" (1/1/14). |
| Entity Type | Delaware Corporation | Unknown Source |
| Entity Headquarters State | Massachusetts | Provided by "John Doe". |
| Entity Headquarters County | Suffolk | Provided by "John Doe". |
| Entity Incorporation State | DE | Defined in "Certificate of Incorporation" (1/1/14). |
| Entity Title | ACME Inc. | Defined in "Certificate of Incorporation" (1/1/14). |

1910c — *NDA Terms*

| Field Name | Value | Value Source |
|---|---|---|
| Term | Fixed Term | Manual entry. |
| - Term of Agreement | one (1) year | Manual entry. |

1910d — *Discloser Address*

| Field Name | Value | Value Source |
|---|---|---|
| Discloser Street 1 | 1 Main Street | Provided by "John Doe". |

RC - 1

COMPUTER-GUIDED CORPORATE GOVERNANCE WITH DOCUMENT GENERATION AND EXECUTION

CROSS-REFERENCE TO RELATED APPLICATIONS

This application claims the benefit of priority under 35 U.S.C. §119(e) of U.S. Pat. App. No. 61/935,548, entitled "Computer-guided Corporate Governance through use of Core-Record-driven Document Generation and Process Automation" and filed Feb. 4, 2014, and U.S. Pat. App. No. 62/024,434, entitled "Computer-guided Corporate Governance through use of Core-Record-driven Document Generation and Process Automation" and filed Jul. 14, 2014, both of which are hereby incorporated by reference in their entirety for all purposes.

BACKGROUND

One of the major obstacles for entrepreneurs founding a startup is navigating the legal landscape of corporate governance. From the moment of incorporation, founders must prepare and execute legal documents related to company formation. The preparation, tracking, and compliance obligations continue through all stages of building a startup, and require preparation of documents such as non-disclosure agreements, consulting and employment agreements, equity management agreements, documents for financing, documents for auditing, mergers and acquisitions documents, minutes for board meetings, etc. Few options exist for mitigating the complexity of creating these documents, and existing solutions that attempt to provide template documents are transaction-centric, disconnected from one another, and do little to educate the founders about the legal implications and ongoing obligations owed by the company. As a result, representations are often neglected, board minutes are compiled once a year from notes, and important documents are backdated to align timelines. In the end, when the company seeks additional funding or is considered for acquisition, it is often stuck with a literal or figurative shoebox of haphazardly-collected legal documents, and it is the company that pays for the correction of any legal irregularities that result.

While the plain document management aspect of the problem can be solved by using content management system (CMS) or data room software, all existing solutions today just scratch the surface of the problem. Who tracks that the documents are consistent with each other? Are we sure that legal professionals do not miss inconsistencies while reviewing hundreds of employment contracts? How do we even know whether a document is relevant? Who tells the founders when certain action is needed? Who enforces the legal framework described in the documents? How can one determine and track the accuracy of information within a document? Who tracks the origin of information within a document? How do you know that the place from which a certain piece of information was copied was an accurate source? Who oversees permissions and general process flow?

A fundamental, holistic approach is needed that changes the legal landscape of corporate governance. Such an approach is described herein, and can be thought of as a Business Operating System.

SUMMARY

In one embodiment, a system may be disclosed for organizing, managing, and reporting data relating to a corporate entity, comprising at least one database configured to store a document record and a core record, the document record relating to a corporate action, the core record stored with the document record; a business logic module, coupled to the at least one database; and at least one document template stored in the at least one database and comprising instructions for generating, at the business logic module, a document based on the core record, the core record further comprising a value reflecting human-readable information to be incorporated into the generated document, the core record further comprising a provenance of the value for allowing the business logic module to assess validity of the value at a given time by evaluating where the value was originated, the business logic module thereby enabling the system to verifiably generate documents that reflect a present state of the corporate entity.

The provenance may be a source document object or an indication that the value was manually entered by a stakeholder. A user interface may be coupled to the business logic module for displaying the generated document to a user for signature. The at least one database may be configured to store an entity object, the entity object further comprising a set of entity records with each entity record of the set of entity records comprising a value and a provenance of the value, wherein at least one entity record of the set of entity records includes a provenance that may be the document object relating to the corporate action. A plurality of processors may be coupled to a database over a network. An authentication module and an electronic signature manager may be configured to insert signatures into generated documents. A retrieval module may be configured to accept a signature unique identifier or quick response (QR) code related to a signature on a previously-executed document for retrieving the stored document. A delegation manager may be configured to perform authorization to perform an action in the system using one or more of permissions, roles, principals or groups, and configured to permit principals to delegate a permission or role to another principal in the context of a particular entity, document, or process. The user interface may be coupled to the business logic module, wherein the user interface may be configured to display available stakeholder capabilities, the stakeholder capabilities enabling a user to modify an entity record through a process. The generated document may be a portable document format (PDF) document. The business logic module may be configured to retrieve, for a given entity record, a prior-generated document storing a core record referenced by the given entity record and with an active status stored in a tag of the prior-generated document.

In another embodiment, a method may be disclosed for organizing, managing, and reporting data relating to a corporate entity, comprising: retrieving an entity record comprising a value and a lineage entry, the lineage entry comprising a value source, the value source referencing a first document; retrieving a corporate action stored as a computer-readable process definition; creating a core record for a second document based on at least one of the entity record, a stakeholder record, or manual input; and generating the second document using the core record and a document template.

The method may include retrieving a permissibility rule associated with a corporate action and an active stakeholder role; and determining, based on the permissibility rule and the stakeholder role, whether a stakeholder may be authorized to perform the corporate action. The method may include storing an active document status with the second document; and retrieving a set of documents that includes the second document in response to a query for all active documents, thereby enabling a user to retrieve documents that reflect a present state of the entity. The method may include retrieving an updated value from a new core record within the second document; updating the entity record with the updated value; and adding, to the entity record, a new lineage entry with a value source referencing the second document, thereby preserving the first document without modification. The first document may be a certificate of incorporation, and the first core record may be a corporation name referenced in the certificate of incorporation. The second document may be one of a board resolution, a shareholder consent, a shareholder communication, and a stock plan. Alternatively, the first document may be a certificate of incorporation, and the second document may be an amendment to the certificate of incorporation.

In another embodiment, a system may be disclosed, comprising a processor for performing data storage and retrieval operations; a database coupled to the processor; and a storage medium comprising instructions which, when executed by the processor, performs steps comprising: retrieving an entity record comprising a value and a lineage entry, the lineage entry comprising a value source, the value source referencing a first document; retrieving a corporate action stored as a computer-readable process definition; creating a core record for a second document based on at least one of the entity record, a stakeholder record, or manual input; and generating the second document using the core record and a document template.

BRIEF DESCRIPTION OF DRAWINGS

FIG. 19 is a schematic diagram of an example report card for a non-disclosure agreement, in accordance with some embodiments.

DETAILED DESCRIPTION

Figure 1:
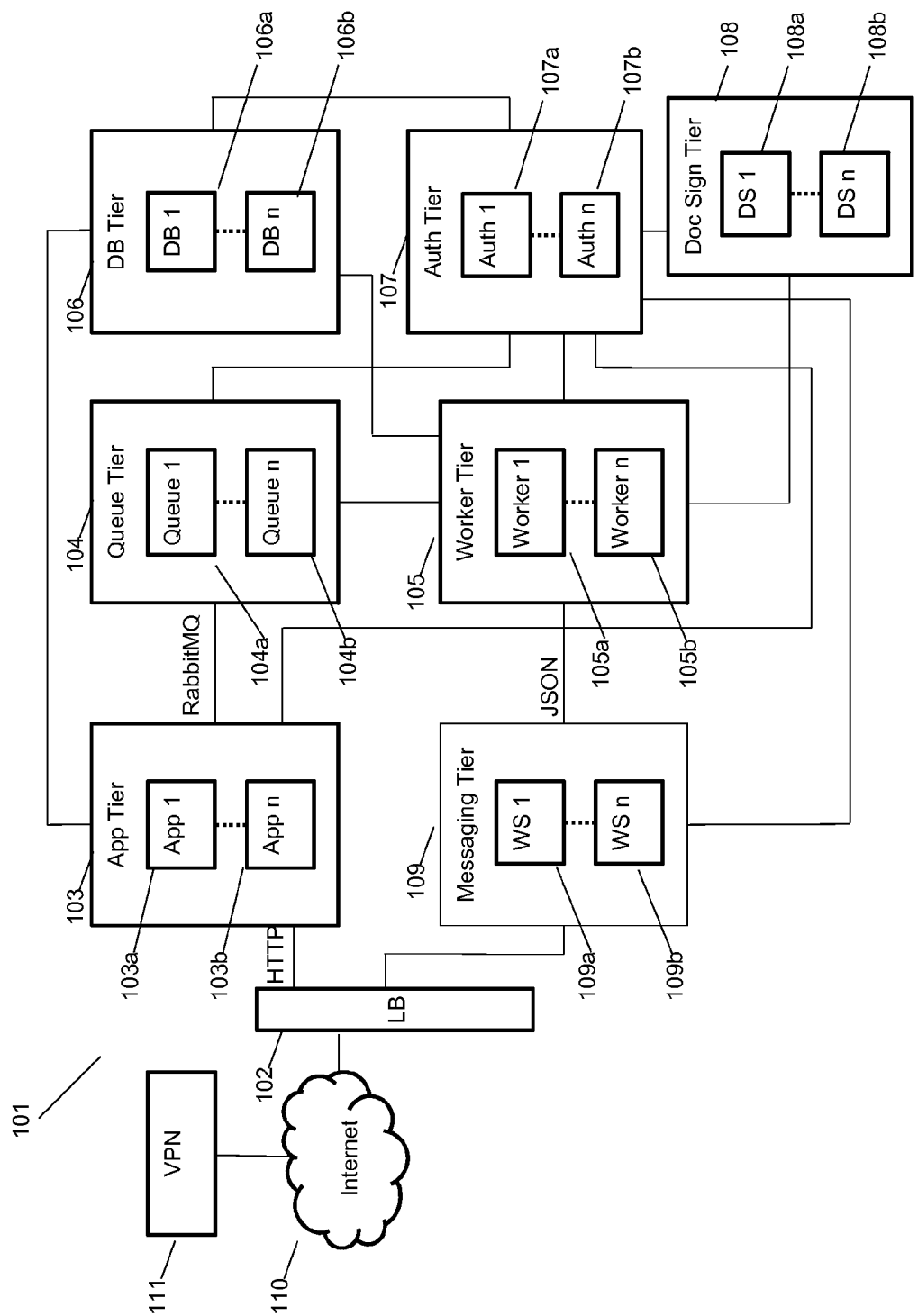
FIG. 1 is a schematic diagram of high-level components of an overall system, in accordance with some embodiments.

The distributed, cloud-based system described herein provides a set of applications to properly govern a corporation or other entity covered by the system. At its core, the system maintains documents in a representation that retains core records in a computer-processable form, each defining business information about the corporation and also stored with a lineage defining a value source for each core record. The system applies legal workflow processes to guide generation of documents from computer-processable document templates, and captures approvals and signatures as evidence of agreement by the parties. The data captured may also be used to guide compliance, drive decision support, and provide reporting.

Some embodiments described herein are also capable of analyzing internal document consistency, identifying key documents, creating anchor documents used as sources of information, and calculating the reliability of documents either individually or as part of an overall process in order to meet diligence or compliance objectives.

Examples of processes that may be facilitated by the use of various embodiments as described herein include: forming a new company, including identifying board members, founders, and stock distributions thereto; adopting corporate by-laws; creating meeting minutes for a board meeting; creating shares authorized by the board of directors; creating board member and shareholder resolutions; creating board member consents; creating non-disclosure agreements; adding and/or removing employees, consultants, board members, corporate officers, or other persons relating to the company; sending, and/or receiving notifications relating to creation of board member resolutions, and/or consents thereto; granting and/or exercising stock options; approving wire transfers, e.g., for the exercise of stock options; creating debt notes or equity financing documents; and initiating investor capital calls, among other processes. In some embodiments, forming a new company may include the creation of formation documents, formalizing the membership of the initial board, identifying the specific legal structure of incorporation, and the distribution and/or issuance of stock to founders and/or board members.

DEFINITIONS

In some embodiments, as used herein, "amendment" may refer to an addition of supplemental information to an executed document. Such additions are made at the granularity of a document section. The availability of an amendment for a document section is defined in the document template, so that that sections critical to the system are not changed.

In some embodiments, as used herein, "analytic decision support" may refer to a mechanism to help a user select the best term within a particular context. The analytics includes usage data, legal reviews, or user ratings. The context considers many dimensions from historical stakeholder data, entity data, geography and time.

In some embodiments, as used herein, "application" may refer to a set of functionalities that represents a particular aspect of corporate governance within the context of a role. Applications are comprised of a summary dashboard panel and a set of pages fulfilling the functionality of the aspect.

In some embodiments, as used herein, "business operating system" may refer to the collective system used to execute corporate governance.

In some embodiments, as used herein, "capability" may refer to the ability to perform an action based on permissions, roles, and groups.

In some embodiments, as used herein, "confidence indicator" may refer to an aggregate metric that represents a measure of the data quality, history and trust of a document. Contributing quality metrics include: Origin (template/upload), e-signature status, and core records origin. The computed value can be displayed to the user in a quantitative or qualitative manner.

In some embodiments, as used herein, "core record" may refer to computer-processable, structured data that represents the core information contained within a document along with the lineage entry. Core records are grouped in sets that reflect various aspects of the data. For system-rendered documents, the core records are used in conjunction with a document template to generate a printable document. In some embodiments, core records are a fundamental record in a document, from which stakeholder records and entity records are derived.

In some embodiments, as used herein, "core record field" may refer to a single field within the core record schema. Types of core record fields include number, text, list, lookup maps, record, date/time, money, signature, and document and stakeholder reference.

In some embodiments, as used herein, "core record schema" may refer to a set of core record fields that describe one subject area of the core records. Core record schemas can be either defined specifically for one document template or for a group of document templates where a standardized data set is needed to effectively analyze the data.

In some embodiments, as used herein, "corporate action" may refer to a set of steps, usually encapsulated in a process, that execute a specific task within corporate governance. Corporate actions are accessible to the user via links in the corporate actions menu that serve as entry points.

In some embodiments, as used herein, "corporate governance" may refer to the system of rules, practices and business processes by which a company is directed and controlled, how it discloses and interacts with stakeholders, and/or how it is audited and evaluated in the course of legal diligence. Corporate governance essentially involves balancing the interests of the many stakeholders in a corporate entity. These may include, but are not limited to, its shareholders, employees, management, customers, suppliers, financiers, government and the community as a whole.

In some embodiments, as used herein, "Delaware corporate execution" may refer to the set of legal processes needed to govern a Delaware corporation as required by Delaware corporate law.

In some embodiments, as used herein, "delegation set" may refer to a set of permissions and roles that that can be delegated to another user in a particular context. The delegation set also contains a title, description and a set of roles required by a user to use the delegation. These sets can be freely defined via configuration.

In some embodiments, as used herein, "document" or "document object" may refer to the electronic form of a document, its core records, tags, report card, authenticity and certification. Physical copies can be printed on demand. Documents can either be uploaded files or generated from predefined document templates. In addition, documents are linked to sets of core records, which are information from the document contents stored in a structured, computer-processable manner. Once a document has been executed it is immutable by leveraging cryptographic signatures to protect against unauthorized changes.

In some embodiments, as used herein, "document modification" may refer to a replacement of a document section with manually-crafted subject matter content. The availability of a modification for a document section is defined in the document template.

In some embodiments, as used herein, "document section" may refer to a part of a document that is used for organizational purposes. They are defined in document templates and commonly have a header, body text and help text. Document sections are further used in the user interface to break up the document for the user.

In some embodiments, as used herein, "document template" may refer to an electronic, computer-processable file that describes how to generate a printable document such as a portable document format (PDF) file given a set of core records. The three components of a document template are rendering instructions, core records definitions, and business logic.

In some embodiments, as used herein, "document term" may refer to a key element in a document with a predefined set of options for a user to choose from. The selected option will affect the content in the document, which can range from simple words/values to several paragraphs. The selected option is captured as part of the document's core record.

In some embodiments, as used herein, "entity" may refer to a corporation, cooperative, partnership, or other legal organization with which it is possible to conduct business. The described system acts on behalf of the entity and by doing so provides corporate governance for the entity. Entities may be legal organizations.

In some embodiments, as used herein, "entity record" may refer to computer-processable, structured data that represents the core information defining an entity. Entity records are grouped in sets that reflect various aspects of the data, and include a value and lineage entries reflecting the full history of the particular entity record. An entity record value is usually a copy of a core record value. An entity record includes, but is not limited to, values relating to one or more of the membership of the board of directors, board of directors voting thresholds, classes of stock, conversion ratios to common stock, and how shareholder votes can be executed.

In some embodiments, as used herein, "external authority" may refer to a trusted third party that can provide certification, review or audit of documents.

In some embodiments, as used herein, "key data" may refer to a subset of core records that is essential to the document and for which no good automatically-applied default exists. Key data may be manually input by a stakeholder to successfully render a document and for this document to be properly handled by the system.

In some embodiments, as used herein, "lineage" may refer to metadata on entity records and stakeholder records that includes a historical account of its values and its value source.

In some embodiments, as used herein, "lineage entry" may refer to a single entry in the lineage that contains the old value, new value, timestamp and value source.

In some embodiments, as used herein, "market of terms" may refer to the concept that user decisions on a choice of term will rise and fall in popularity based on usage, legal review, negotiating leverage and the choice's performance through legal challenges.

In some embodiments, as used herein, "permission" may refer to a security object representing the ability to complete a particular action. It represents the finest grain of access control in the system.

In some embodiments, as used herein, "principal" may refer to a security object also commonly known as "subject" that represents a stakeholder in the context of access control and security in general.

In some embodiments, as used herein, "process" may refer to a workflow that is executed to achieve a corporate action or more generally any system objective. A process contains business logic and user interface instructions that enable corporate actions to be completed. User interfaces are generated in a fully automated manner through the system.

In some embodiments, as used herein, "process definition" may refer to a set of data structures describing the execution paths of a process. Process definitions include activities, transitions, and computer-processable business logic.

In some embodiments, as used herein, "process execution engine" may refer to a module and/or executable code that reads process instructions and executes them. Through the proper execution of the process, the engine enforces the correctness of the legal corporate governance processes.

In some embodiments, as used herein, "report card" may refer to a summary of a document's quality including the confidence indicator, activity log, selected document terms, core records, and value source.

In some embodiments, as used herein, "role" may refer to refers to an abstract group of obligations and rights within an entity and can be defined in documents or are commonly agreed upon. The system can assign roles to users via processes, administrative user interfaces, or through delegation by other users. Roles are security objects that represent a set of permissions. Examples of roles include associate (e.g., a third party to a given entity), employee, manager (of one or more employees), corporate officer, board member, and administrator. A user may have multiple roles. Each role may cause a corresponding dashboard in the user interface to be exposed, and may define actions the user is authorized to take on behalf of themselves or the company.

In some embodiments, as used herein, "section" may refer to a part of a document that discusses a specific topic of the document matter. It includes content in the form of text, drawings and other printable matter; the terms; and the business logic to modify contents based on the terms and other core records.

In some embodiments, as used herein, "secure data provenance" may refer to metadata on entity records and core records defining the quality and origin of data values that are stored with the document in a immutable way after document execution. Quality refers to the method in which data has been gathered, who is responsible for the source of the data, ideally including information on the originator of the data. Secured provenance refers to providing integrity and confidentiality guarantees to provenance information that this metadata cannot be rewritten, and users can specify who else can look into their actions on the object.

In some embodiments, as used herein, "signature" may refer to an image containing either a screen-entered, uploaded or generated form of the user's signature, or a representation thereof. In some embodiments, a signature on a document is given a unique id and encoded in a Quick Response (QR) code encoding an URL, which can be used to find the corresponding document at any time. Signatures are stored as part of the core records of a document. The ESIGN act and analogous international agreements/laws can govern the legal definition of a signature.

In some embodiments, as used herein, "stakeholder" may refer to a single individual that is associated with an entity. Governance-centric roles are used for authorization to provide access to corporate actions, processes, documents and applications.

In some embodiments, as used herein, "stakeholder record" may refer to computer-processable, structured data that represents the core information defining a stakeholder. Stakeholder records are grouped in sets that reflect various aspects of the data. Stakeholder records may be entered by the stakeholder through the graphical user interface.

In some embodiments, as used herein, "standardization" may refer to a quality of a document referring to the degree of attention to be received by a document, as during an audit. If a document is standard it may have common term values for the entity, the system has high confidence in its content and its execution.

In some embodiments, as used herein, "tag" may refer to a keyword description of a document, effectively making it a flag, that may be stored and presented for editing as human-readable text. Tags are hierarchically organized through namespaces and can be matched at any level of the hierarchy. In addition, tags serve additional roles such as acting permissions, causing varied business logic behavior, and providing custom user interface views.

In some embodiments, as used herein, "term" may refer to a field in the core records that provides a choice of values for a high-level concept within the subject matter. Specific options of the term can require further data fields of the core records schema.

In some embodiments, as used herein, "user" may refer to an individual within the business operating system. A user has records that provide data about the individual in the system, which may include access credentials to the system. The credentials are used for authentication of the user with the system.

In some embodiments, as used herein, "value source" may refer to the method description of how and where a value was sourced. A value could be sourced from another system document's core records, stakeholder records, manual input by a stakeholder, or textual description. A value source may be a reference to another document, a reference to a stakeholder's data, or an indication that the stakeholder entered it manually.

System Overview

The functionality of the system described herein is facilitated in part by integration between information storage capabilities, process execution, document generation and electronic signatures. The system may include one or more computer devices that run one or more instances of the system. The graphical user interface is used to communicate with users and external authorities. Via back-end Internet-enabled network connections, the system communicates with external document storage systems to upload or download documents.

One objective of the system is to properly execute and enforce entity corporate governance processes as defined by federal and state law. This is accomplished by executing corporate governance tasks via a set of processes defined by computer-readable process definitions that are executed in a process execution engine. Features that are not directly tied to a process are implemented using programmed and configured business logic.

The core responsibilities of corporate governance processes are proper creation and execution of documents, management of entity record state, and administration of stakeholders and their roles within the entity. Documents are uploaded or generated from document templates. Document templates may include core record definitions, document rendering instructions, business logic, and a set of default tags. The core records definitions declares the core record schemas and data record fields of the core record data used within the rendered document. The rendering instructions may include the rendering markup, document/rendering structure, and core record references. These components are used to render the document into common publication formats, for example PDF and HTML, where the core record references are used to insert the core record data into the document content. The document/rendering structure can be used to extract pieces of the document, such as sections.

Corporate governance-related data is stored in entity records, which track the current value and a chronologically-ordered list of lineage entries that may include one or more of the old value, new value, timestamp, and value source. Entity record schemas are used to define the data to be stored. The system manages users outside the context of the entity. Stakeholders are specific to an entity and store any of their data in stakeholder records, their structure defined by stakeholder record schemas. However, documents are the a priori source for any data about the entity. Both uploaded and generated documents may include core records, binary file data, a report card, and tags.

The security manager component may restrict stakeholder access as defined by the entity records, administrator setup and role delegation.

The system communicates via a network with external document storage solutions to synchronize document binary file data. In some embodiments, examples of storage systems that could be used for document binary file data include Box.com, Dropbox, Google Drive, a private WebDAV file store, or any other cloud-based content storage solution.

E-Signatures in order to truly reduce paper for documentation, it should be possible to sign documents electronically. Since the passage of the ESIGN act in 2000, electronic signatures have the same legal effects as traditional signatures. Under the law, the signature can be any text, including in a particular font or an image. The signing occurs at the moment the signee assigns the signature to a document by expressively clicking the "sign" button.

In some embodiments, a stakeholder may set up an electronic signature. Both the full signature and initials may be allowed. Setup may include uploading an image of the stakeholder's physical signature, or the creation of signature text and initial text together with the particular text in which to display the signature.

A signature or list of signatures may be a special type of core record field. A signature core record field may include a timestamp, security code, stakeholder and document reference. A security code is a unique identifier of the signature as applied by a stakeholder to this document at the specified position, and may be a unique user identifier (UUID). A signature is rendered within a signature block of a document, which may include a pictorial representation inserted into the document. As a security measure, the security code of the signature is rendered as is a QR code and inserted as well. This allows anyone to scan the QR code and retrieve information about the document, such as the title and all signatories to verify the authenticity of the document and the signatures.

In some embodiments, whenever a document is signed, an audit log entry may be created capturing the document ID, date/time, user and IP address. In addition, a security code, such as a 16-byte global unique identifier (GUID), is created and logged. The security code is placed into the document below the signature. Security codes may be unique in the system, so that any given security code maps to a specific signature in a specific document. In some embodiments, the security code of a signature can be used to look up documents. The codes may be typed in manually, or a QR code or bar code may be scanned using a camera on a mobile device to enter the code. In some embodiments, the security code can also be used to verify the authenticity of a document. This can be accomplished by scanning all security codes for a given document and asking the system whether there exists a document where all these codes are present. In some embodiments, verification may also show the name and date of each signee for verification. This mechanism protects against altering the signature image/text, altering the security code of a signature, or replacing a signature with another. In some embodiments, Adobe Certified Document Services (CDS) cryptographic algorithms may be used upon signing to cause documents to become immutable after a document is signed and finalized.

The e-signature management component then applies and certifies the signatures on the document.

Documents

Documents can be generated and executed by the system based on core records or uploaded from an external source. Embodiments may capture the stakeholder, timestamp, and set an upload flag, which are used to determine that a document was uploaded from an external source. In these embodiments, core record information can be gathered manually.

Once a document has been executed, it cannot be changed, in some embodiments. However, a document can be amended through a system process. An amendment is a change to a section in the document. Similar to a modification, an amendment is free form text to replace an entire section of the executed document. Once the amendment to the document is ready, the system executes the amendment and generates a document for the amendment that contains a core data reference to the original document amended. This is done so that the original document is left unchanged. The new amendment document is executed and made immutable with a reference to the original document. Whenever a document is rendered for viewing by the system, the system can query whether any amendments have been made to it.

When a document is created, the system tracks whether a selected term was one of the following: a default option; a entity default option; a non-default option; or a custom text option. This information may later be used for reporting purposes.

After execution, the document is stored and available for viewing pursuant to the permissions on the document. The document is stored indefinitely and cannot be deleted by a user of the system. The document may be used to register the triggering of future events, for example, the end of a contract's term. Events may also be registered based on the document's core records, for example a warning for a non-compete provision after the relationship with an entity terminates.

Tags may store various information about a document in a human-readable text format. For example, the "active" tag could be applied to a document once it becomes legally effective. As another example, the tag "certificate of incorporation" could be applied to a document to assign a certain document type. Once a tag is applied, it may be used to search for and retrieve one or more documents. For example, using these two tags in combination, the active certificate of incorporation document could be retrieved. Tags may be used to create a searchable hierarchy of documents. For example, the tag "governance" may be applied to all documents pertaining to corporate governance functions. Additionally, the more specific tag "governance: formation" may be applied to all documents pertaining to corporate entity formation. The system will store both "governance" and "governance: formation" when only the latter tag is assigned. This allows the system to quickly allow search and retrieval of all governance-related documents. As another example, the tag "equity grant" represents a generic term pertaining to stock grants, while more specific tags may be assigned to properly relect types of stock grants, such as "equity grant: incentive stock option," "equity grant: non-qualified option," and "equity grant: restricted stock award." Tags may be applied at the time a document is made, or at a later date, such as when a document becomes active or inactive. Tags may be applied at the time a document is made, or at a later date, such as when a document becomes active or inactive.

Another type of structured data the system tracks are the selected terms within a document. Terms are by nature choices of a few different options. The system may provide a default option. In addition entities can provide their own default options for document terms. In an embodiment, the non-disclosure agreement contains a term defining the duration of the agreement having the options of one year, two years, and perpetual, with one year being the default option. However, a particular company might decide that two years is more appropriate for their business and change that default option within the context of that entity.

Information Storage and Quality

Whether documents are stored either in paper form, scanned electronic documents or text-processor generated electronic files, these formats may not facilitate capture of information about the contents of the document or its historical background. By contrast, when documents are generated by the system, according to in some embodiments, documents can be generated from standardized document templates and may facilitate the capture of information. The system can, in some embodiments, discourage uploading scanned documents for this reason. When documents are generated using provided and computed data, the compilation of this data is stored along with the generated file as core records.

In addition, the system tracks the value source of the core records entries. For example, a document may reference the entity's legal name by pulling the current value of the legal name from the appropriate entity record. In one embodiment, the current value of the entity's legal name could have been obtained from an executed certificate of incorporation document. This may mean the document's core record storing the legal name for the document may include a value source referring to the executed certificate of incorporation. Other examples of origins of a value source could come from a stakeholder's manual input into the system or a stakeholder record.

Confidence Rating

Confidence of a document in the system is derived from the value source of its core records, source of document generation, and mode of execution. The inputs to whether a value source is trusted would include whether the value source is from a document or simply manual user input. In the case of a document, the criteria of trust for the value source is similar as how the document itself would be judged. Was the document generated by the system or was it uploaded externally? Has the content of the document been verified by an external authority? Was the document executed within the system? How much trust does the system have with any signers of the document? These measures help stakeholders and auditors understand how much the system can verify about the document to inform whether one should trust the content of the document and its core record metadata. Manual entry of information or sources of information may introduce or increase the possibility of human error into the system, if a user enters data that does not correctly reflect the information encoded in the system about the document. This may affect the confidence indicator, since there is no way to verify the core record data collected in an upload scenario without third-party review.

Standardization

The level of standardization of a document in this system is derived from source of document generation, use of modification or amendment, mode of execution, and choice of term values. Was the document generated by the system? Was the content of the document text customized through a free-form text modification? Was the document executed within the system? Are the terms the stakeholder chose for the document standard for the entity or custom? These factors play into whether certain documents merit additional attention during legal diligence.

To give the user a quick idea about the quality of a given document, the system provides a report card, which may include a confidence indicator, an action audit, a term summary, and a list of core records including value source. The confidence indicator is computed from core records and metadata of the document. The best score that a document can receive may be set to one hundred, in some embodiments. In this embodiment, a document having a score of one hundred would have the following attributes: It was generated from a document template; its terms are all default terms; there are no document modifications; it was signed by stakeholders via the system; and it has a value source of highest confidence. The score decreases, for example, if a document has been uploaded and no e-signatures were applied. The confidence indicator, along with other document quality data, may be collected and attached as the document report card. The aforementioned functionality can then be used to quickly validate the state of corporate documentation, which can greatly reduce the volume of documents to be reviewed by outside experts, such as attorneys, auditors, or the like.

Processes

During execution of processes generating one or more documents, a document template defines which core records need to be filled out to complete the document. The core records are seeded by computing as many default values as possible. The business logic defined in a process provides the user with a guided workflow to capture core record data which can require user input. Other core record data can be captured from entity records and previously executed document core records. The document template also defines an initial set of tags that identify what type of document will be generated, how it should be categorized, and an initial status. Once enough information has been captured to generate the document, a graphical user interface renders an interactive preview for the stakeholder.

This interactive preview breaks the document into sections that are defined by the document template of that document. Within each section, the document terms and core record fields that are specific to the section are exposed and available for input as configured in the document template. At this stage, sections may also be available for document modification as defined within the document template, which allows for changes to the document content at the granularity of a section. A document modification can negatively affect document confidence and could affect the ability of the system to automate future corporate governance processes. The stakeholder can then review and release the document for execution. The process's business logic defines the execution process. Execution may include but is not limited to a collection of electronic signatures on the document or external approval, e.g. board or shareholder approval. The system signals that a document is executed by changing its status tag.

In a user uploaded document-based process, the document is uploaded and business logic defines what core record information should be collected manually from the user. Once the information has been captured, it can be released for finalization.

Once a document has been executed through signature or approval, the process completes the document by cryptographically signing it to verify that there have been no changes after finalization. This includes the document's binary file as well as the core records related to the document.

During the execution of a document, the process may define that this document defines or changes an entry of an entity record. In such cases, the process will push a new value including a lineage entry into the entity record. The previous value is preserved in the lineage history but going forward, any document referencing the updated field will receive the value as defined by the new document. In one embodiment, the entity executes an amendment to the certificate of incorporation to change the number of authorized shares of the entity. The process will define that the amendment the stakeholder performed with Delaware defined the new value of "number of authorized shares" and will push the new value and its value source (the amendment to the certificate of incorporation document) to the entity record to replace the old value and add a lineage entry.

Reporting and Compliance

In some embodiments, once any core record is recorded, entity stakeholders can receive reports about many aspects of the entity. These can be simple event reminders such as a looming 83(b) filing deadline or as complex as creating the representations and warranties during a merger and acquisition. A non-trivial example of reports are the stock ledger and capitalization table. Because the system captures founder stock grants, preferred shares (via financing) and stock option plan grants, it has all of the information required to compute both of those reports.

The system may also use a scheduler to run periodic tasks to enforce actions required by the legal framework of the entity or to notify stakeholder of certain events, in some embodiments. For example, the system could start an employment agreement renewal process when it detects that a contract is running out in the near future.

One of the benefits of the reporting capability is the ability to enforce contractual obligations. By way of example, an investor usually has certain information rights, which are memorialized in documents such as an investor agreement. Embodiments of this system and method store these required representations in a computer-processable form, which allows founders and other stakeholders to abide by representations, warranties, obligations and so on set forth in documents of the entity. This capability enhances the overall value of the entity.

The system also stores information for the entity itself. Another aspect of compliance is the enforcement of proper procedures when core information about the entity is changed. The system associates a unique process with any field that requires documentation and approvals. For example, if the company needs to increase the amount of authorized shares, shareholder and board approval is needed for an amendment to the certificate of incorporation.

Because all processes in the system are modeled using standard workflow and business process tools, it is possible to create visual representations in the form of flowchart images, i.e., the change authorized shares process. Those images can be used to demonstrate compliance with federal and local laws (for example, Sarbanes-Oxley compliance) as well as industry standards such as the ISO 9000 family of quality management standards.

Analytic Decision Support

A central goal of the system is to empower a user acting on behalf of the company to be able to execute common processes without needing legal support for simple information. In some embodiments, a decision support engine uses analytics to provide decision support. For example, decision support may be provided through the use of analytic trending capturing how other users have chosen values for legal terms in processes performed within the system. This trending information can help a user understand common selections. In order for the trending information to be used effectively, it may be accompanied with context to describe what is being presented as well as information describing what kind of data was captured to create trust. Exposing term values with frequency of usage will create a market of terms since it will be clear how and when certain values are being used.

The algorithms and techniques used to provide a confidence assessment of trending information can provide decision support as users execute processes within the system. For example, law firms provide trend information to their clients based on their experience, and in some embodiments, this system can quickly provide similar trending information in the context of a specific decision across multiple companies. Summary trend information can be dynamically filtered by many dimensions, including time, geography, industry, maturity of organization, confidence of organization and more. This information is only available because the system is summarizing the execution of these processes within the system and the user can decide the level of confidence desired from this trending information.

Another source of analytic decision support comes from the summarization of historical actions undertaken by an individual or an entity. Since the system provides standard templates and many of these documents are executed many times in different contexts it is helpful to be able to expose information about which version of a term a user or entity has accepted in the past. If an investor is negotiating a convertible note with an entrepreneur, it is helpful for the investor to understand that they have accepted the exact form of the expenses provision five times in the last year. Such information can avoid unnecessary negotiations that would otherwise drive up the costs of the financing. Similarly, maintaining metrics about previous history of executed terms that an entity has previously accepted helps focus attention to what's different and more important to the different parties.

Confidence that data in a particular document is genuine and valuable for trending could be based on but is not limited to:

Document execution confidence—prior to execution, a user can certify her account as genuine by connecting to her social profiles and authenticating email addresses. Corporate domain verification may also be used, i.e., an email domain name may be checked against a known email domain name to verify that a given user has an address with a certain entity.

Entity certification—the system checks that the entity name is registered with appropriate agency, officers are certified system users with certified email addresses of the entity, and the company has been verified by a trusted third party organization.

Document source—represents a flag indicating whether the document was uploaded and information manually added or generated by the system during the course of execution.

External authority verification—an indicator whether the document been audited and certified by a trusted third party. This could be but is not limited to a lawyer or firm verified by the system, a financial institution, auditing organization or government agency.

Education

One of the primary features of the system is to provide transparency to corporate governance. The goal is to not only handle processes and documentation for corporate leadership, but to educate all parties to an agreement about the processes so that they understand the rights and obligations the documents impose.

One step towards this goal is to break up the processes into small, understandable steps. The system provides "wizards," or directed exploration tools, to clearly outline each step of a process. Each step in the process in turn contains help text that explains its purpose. Any technical option or term is explained through contextual help.

In addition to contextual help, the system provides detailed help on document contents. Document templates are marked up with non-legal explanations of each section within a document. The terms and their options are explained with additional help steps so that the user understands each term and its consequences. The system also provides commenting functionality allowing users to discuss different options for terms and their legal implications. In addition the administrator can set entity-wide defaults options easing the decision for the user.

The system may provide statistics on the usage of terms in documents (where the word term encompasses the meaning of entire clauses within contractual agreements, as well as its other meanings, including single words), giving the user an indication of the most commonly used ones as well as inform the user of unusual selections. Should the user be confused by anything, links are provided to ask counsel to review a given term.

Legal Execution Framework Driven by Entity Records

Entity records are schema-defined data sets mapped to the key information necessary to execute external and internal corporate actions undertaken by the system. Changing this key information is governed by different rules as to who can initiate such a change and the set of approvals and processes that may be followed to execute the task. This system is configured to control access to view entity records values and to attach a process to each value of an entity record that controls modifications to it. These processes guide the initiating stakeholder and execute the appropriate legal processes by gathering information from stakeholders, generating documents, gathering signatures and executing governing approval processes, e.g. Board and shareholder approvals. The system is then configured to execute processes based on the current status of the entity records.

In the example of Delaware corporate execution, the important entity records define the membership of the board of directors and stockholders and how these bodies execute approvals. The board of directors entity record captures the members of the board and definitional data describing how it operates. This includes but is not limited to user information about each member, roles of each member as well as how many members are allowed, number of members needed to reach a quorum for a meeting, and more. The capital structure of the company is captured by entity records defining the different classes of stock, how the classes of stock interact for control and voting. For voting consideration, the structure could have all classes converted to common stock and vote as a single class or each class could vote separately. Once the classes for voting are defined, the entity records can capture how the stockholders vote. This entity record information for voting is leveraged as part of processes to automate the execution and approval capture from the board of directors and shareholders.

Once any necessary entity records to define corporate execution are complete, the system can expose processes executing with legally-effective required approvals rather than manual input to change various other entity records. For example, if the company needed to increase the number of authorized shares of the company, there is a specific change authorized shares process to execute within the system. To perform this change to the entity record requires board and shareholder approval, as well as an amendment to the certificate of incorporation that may be filed with the Delaware Secretary of State. To execute this process, the process may gather information from the process initiator (the user who initiated the process) to create core records. Those core records are used to generate the amendment document that may be filed and the board and shareholder resolutions that may be approved. Once the process owner decides to execute this change, the system may help automate approvals. The entity record modification process may block until both board and shareholder approvals are granted.

The shareholder approval may be performed based on entity records defining how such a vote may be executed and may send electronic communication, for example e-mails, and may require stakeholders to sign a consent document. Alternatively, the process owner can decide to have a shareholder meeting and submit minutes to the system indicating that the resolution was approved. The board approval of the resolutions can also be achieved by consent or through a board meeting and are executed based on the entity records defining the process or a choice made by the process initiator. Once both approvals are received the original change process is unblocked and the amendment can be filed with the state of Delaware. The system may guide the user on how to file and request evidence of the filing. When the process is complete, the system may have captured the documents and approvals with appropriate relationships and update the entity record with its new value along with the lineage to the documents that define the change.

As fields in the entity records are filled out, the system exposes new processes to be available to the company. For example, a process to create a stock incentive plan may reserve shares of common stock to enable the company to issue stock options to employees. Creation of such a stock incentive plan requires information input from a corporate officer (the user that initiated the process) that define the core records to generate the stock incentive plan document. These core records are also used to generate board and shareholder resolutions that may be approved by the board and stockholders as defined by the corresponding legal process. Once the approvals are gathered, the system tags the documents as approved, pushes relevant core records from the documents into entity records that track all stock incentive plans. The successful execution of creating a stock incentive plan now enables the entity to execute processes related to granting stock to employees and consultants pursuant to the approved plan. These processes may read the entity records to make sure legal restrictions are maintained. For example, the number of shares grantable under the plan are limited and the process may use analytics to calculate how many shares have already been granted to ensure that there are enough available shares for a new grant. If not, the system may provide the user with a link to execute a process to create a new plan or increase the number of shares in the original plan. Such a process may require board and shareholder approval as defined by Delaware corporate law.

When a change to an entity record is made directly, the system may have a process to point the user to the necessary documents, approvals and filings that may be made to execute a change. The system leverages other entity records to guide the user and help automate the generation of necessary documents, gathering of approvals, execution of filings and then actually execute the entity record value change. For example, to change the number of authorized shares in a Delaware corporation today, the process must guide the user to provide the data needed to create core records to generate an amendment to the certificate of incorporation, generate board and shareholder resolutions and automate the board and shareholder approval processes to then file the amendment with the state of Delaware. Once confirmation of a successful filing is received from Delaware, the system will execute the change to the number of authorized shares of the company.

The system may allow stakeholders to delegate access to documents or to act on their behalf for a particular process or kind of process, e.g., equity grants. An individual may decide they want to delegate their execution rights to sign personal documents to their lawyer. A corporate officer may decide to delegate his or her signing authority for a particular process to another officer. Since the execution of that document within the process is performed in the same system that is storing the delegation agreement, the system can track the lineage of the authority of the signature. This lineage can be done readily since the process, stakeholder rights, document generation and execution are all performed in one integrated system.

Processes

Processes for using the system described herein follow.

Processes for Entity Creation

In some embodiments, an entity may be created by the following process. A user, called the creator, may verify a security token, which may be provided through an out-of-band channel before the user is permitted to proceed. Once the token is verified, the user may then be permitted to create an entity, create users, and show next steps for the entity. The user's user interface view may be redirected to the new entity.

In some embodiments, a new corporate entity may be incorporated by the following process. The process may involve an incorporator and an administrator, as well as the system. The administrator may begin the incorporation process and may select the incorporator. If the administrator has prior-executed legal documents for upload, those documents may be uploaded and key data contained in the document may be manually entered via the user interface. In certain cases the documents may need to be re-signed, which can be performed on the system. If the administrator is not the incorporator, the administrator may be directed to wait while the incorporator reviews and signs the documents. Once the documents are signed, the system may store the key data, including the registered agent address and the incorporator address and the certificate of incorporation terms, as core records on the respective document and as entity records.

In some scenarios, if there are no prior documents, the key data may be requested by the system, such as the registered agent address and the incorporator address and the certificate of incorporation terms. The system may then generate the certificate of incorporation, request signatures from any incorporators, and, once signed, await proof to be manually input that the signed document has been filed with a state authority, such as the Delaware Secretary of State. The proof may be an uploaded copy of a signed and sealed document. The proof may be stored in the system with an evidence tag, for later retrieval and use. The date of the proof may be set as the incorporation date in the system for the certificate of incorporation. All collected data is stored in core records of the generated documents and then also referenced in entity records. The incorporation using the document-generating path is now complete.

Following incorporation, various processes may be performed, which may include one or more of the following steps. An administrative user, who may be the incorporator, may, using the system, define a board of directors, assign corporate officers, define a set of founders, and grant a stock distribution for the founders. Certain founders may be designated as vesting or non-vesting. Board members may be assigned specific roles, including president, secretary, and treasurer. In the common case where the corporation has been incorporated by a sole incorporator, the system may then retrieve default data and determine any other data needed in order to generate a document, the consent in lieu of meeting of sole incorporator, for adopting bylaws, appointing directors, and performing certain other corporate functions as needed. The administrative user may be prompted for additional information and review. A bylaws document may be generated at this time as well. If the administrative user is the sole incorporator, he or she may review and sign electronically in the system. Otherwise, the document may be submitted to the sole incorporator for review and signature.

Once this document is signed, causing the bylaws to be adopted and the directors to be appointed, additional documents may be generated. Using information from the system about founders and authorized shares, and input requested at this step from the administrative user, the system may generate a founder's agreement for assigning stock to each of the founders. Using information from the entity record and from the founder's agreement, the system may generate stock certificate forms for issuance of stock. Next, the system may use available information regarding the founders' shareholdings to generate a founder's stock restriction agreement. Next, the system may generate a consent in lieu of the first meeting of the board of directors for approving the founder's stock restriction agreement, the stock certificates, the share subscription letter, and the founder's agreement. Next, the system may request signatures from each of the directors. Once all documents are signed, the documents may be updated with effective dates, and the share subscription letter vesting information may be updated. Finally, the system may await evidence that the founders paid to purchase their shares of stock, upon which time the option exercise information is noted as active.

General Corporate Processes

In some embodiments, when initializing the system, a user may be created. If no user exists on the system, a user may be created upon system start. Alternatively, the manager may use a create user process to provision a new user. The manager or new user may initialize user data such as username and email. The user is then sent an invitation by email, and then asked to create a signature and fill out contact information.

In some embodiments, a user reset process may be performed by the system, which may include one or more of the following steps. The system may assign a new user as a performing user, or may have previously assigned the new user as a user. The system may send a reset email to the user's email account, the email including a link for the user to automatically access the system and/or reset his password. In some embodiments, secure authentication tokens, multi-factor authentication, and other authentication systems may be used to ensure that a user may not access the system without due authorization.

In some embodiments, an add consultant process may be performed by the system, which may include one or more of the following steps. A manager may select a user to be identified as a consultant, and the system may set the stakeholder as a consultant. The consulting agreement for the consultant may be created from a document template, with the manager filling in key data. Alternatively, the consulting agreement may be uploaded. Once the manager has reviewed, released, and signed the consulting agreement, the consulting agreement may need to be approved and signed by a corporate officer. The manager's status is thus checked to determine if the manager is already a corporate officer, or if another officer is needed to approve. The system may send a welcome email to the consultant, with a link to create a user on the system. The consultant may then log in, update her address, create a signature if necessary, and sign the consulting agreement electronically, formalizing the relationship. In some embodiments, when updating a prior consulting agreement, only the corporate officer, not the consultant herself, may need to sign.

In some embodiments, an add employee process may be performed by the system, which may include one or more of the following steps. A manager may select a person to be hired as an employee, and may identify a manager for that employee. The system may then set these parameters in a process being executed on the system. The system may then create a confidentiality agreement, an offer letter, and/or other documents using default values, including the person's name, title, and manager, as appropriate, and as previously identified. If additional key data or parameters are needed to complete the documents, they may be requested from the manager. Alternatively, the confidentiality agreement and offer letter are uploaded. If the manager is not also a corporate officer, a corporate officer's signature is requested and obtained. Once the offer letter and confidentiality agreement are ready for the new employee, a welcome email is sent to the new employee, with a link allowing the new employee to create an account, create a signature, and sign the employment documents. The offer letter and confidentiality agreement are updated in the system to reflect the corrected user data in the system and to reflect the signature of the employee. Certain roles for the employee take effect in the system once the employee has signed the agreements.

In some embodiments, an employee W-4 issuance process may be performed by the system, which may include one or more of the following steps. An administrative employee may start the process by selecting a document source, which describes whether the document is uploaded or generated by the system, and an employee to whom a W-4 should be issued. The system may then request that the administrative employee check the addresses of the corporate entity and the employee in question. The system may also request that the administrative employee indicate whether the document will be uploaded or should be generated by the system. Once the addresses are checked, the system uses its database to retrieve other relevant information from the system, such as the W-4 employee's salary and salary-related data, and the system may then generate the W-4. Whether generated or uploaded, the W-4 document is then presented to the administrative employee for signing. The system notes the date when the W-4 document is signed. The administrative employee may be requested to review and release the W-4 documents, at which a corporate officer may be requested to approve the W-4 documents before they are sent out or delivered.

In some embodiments, a create resolution process may be performed by the system, which may include one or more of the following steps. A corporate officer may initiate the process, upon which the system may initialize a resolution document object with default values. The corporate officer may provide additional information, key data, and/or resolution metadata, which may be used by the system to generate a resolution document. The resolution document may be provided to the corporate officer for approval. The same process may be used to create and approve corporate bylaws.

In some embodiments, a board resolution recordation process may be performed by the system, which may include one or more of the following steps. One or more board resolutions may already have been created and may be on the system. A board secretary may initiate the process of recording these board resolutions, at which time the system may simply mark the resolutions as approved in the system. In some embodiments, the system may also find a board meeting minutes document and update the board minutes to reflect the approval of the resolutions. If the board meeting minutes do not exist on the system, the system may create a board meeting minutes document using the relevant document template and default board meeting minutes metadata. The board secretary may be presented with the board meeting minutes document for review, in some embodiments.

In some embodiments, a create meeting minutes process may be performed by the system, which may include one or more of the following steps. Once a board secretary initiates the process, the system may search for outstanding but not completed board minutes, which may be a search for board minutes for the most recent meeting. The system may then query the board secretary to input key data regarding, e.g., the date of the meeting and/or what resolutions were passed, along with any other notes in a text format or any other format. If board minutes already exist for the identified meeting, the changes may be merged with the existing minutes. If the board minutes reflect approval of any pending resolutions, the resolutions may be marked in the system as being approved. The system may then generate a meeting minutes document for review by the board secretary. Upon review and approval, the system may create a meeting minutes resolution to be approved and signed by the board secretary and/or others.

In some embodiments, a create shareholder consent process may be performed by the system, which may include one or more of the following steps. A corporate officer may begin the process by providing certain key data, including a list of resolutions to include and a list of shareholders to whom the consent should be sent. This set of designated shareholders may be stored and used by the create shareholder consent process in order to generate shareholder consents to these shareholders. As the system has knowledge about each shareholder of the company, in some embodiments, the system may prompt the corporate officer to select enough shareholders to achieve the consent of a majority of shareholders. The shareholder consents may then be prepared for review by the corporate officer. Once the corporate officer has reviewed, the shareholder consents may be sent out via email for signature on the system. The corporate officer may monitor the signature process in real time, i.e., may be able to access and monitor whether a shareholder email has been sent, whether the shareholder has read the email, whether the shareholder has clicked the link to the system to read the attached consent document, whether the shareholder has read to the end of the document or what percentage of the document has been read, whether the shareholder has signed the document and what percentage of the document has been signed, and what number of signatures have been received and what number is outstanding. This signature process monitoring information may be made available in any or all of the processes described herein, or in another process. Once the signatures are collected and the shareholder consent is effective, the system may set the effective date, mark the shareholder consent as active, mark the affected resolutions as approved, and mark the affected resolutions as active.

Although not every shareholder must consent to pass corporate resolutions, every shareholder has the right to be notified of such resolutions. In some embodiments, a create shareholder communication process may be performed by the system, which may include one or more of the following steps. A corporate officer may create a shareholder communication, which may involve inputting key data. Alternately, the corporate officer may upload an already-created shareholder communication document to the system. The uploaded document may be scanned for metadata and data. In some cases, shareholder consents may be tagged as communicated. If the corporate officer indicates that emails should be sent, or if a setting has been previously made to send emails regarding shareholder communications, individual emails may be sent to each shareholder containing the content of the shareholder communication.

In some embodiments, a create board consent process may be performed by the system, which may include one or more of the following steps. A manager may input a list of resolutions to include, which may be combined by the system with default metadata to generate a board consent document. The manager may review the document and then request signatures. The system may then email the directors to sign. The manager may monitor the signatures applied in real time. Once the required signatures are retrieved, the system may set a consent effective date, activate the consent, set resolution approval metadata, and activate the resolutions.

In addition to creating documents incorporating the company, the creation of a new bank account in the name of the company may facilitate the issuance of stock. In some embodiments, creation of a new bank account may be initiated by the system, as follows. A bank may enable the system to create accounts and to initiate transfers of funds among accounts, in some embodiments. For example, the system may send a request to the bank electronically, including the name of the corporate entity. In some embodiments, the request may be part of the workflow or process that is invoked when the user requests the creation of a new corporate entity. In other embodiments, the request may be invoked when a user specifically requests the creation of a bank account. In some embodiments, the user may specifically indicate which bank is requested to be used for the new account. The request may be sent via the Internet using HyperText Transport Protocol (HTTP), using JavaScript Object Notation (JSON), in some embodiments, or via another comparable method that is compatible with systems operated by the bank. The name of the corporate entity may be retrieved from the document record for the incorporation document for the corporation. The identification of the specific document record to be retrieved may be performed by the operation of the workflow or process stored within the system, in some embodiments. Other information may be included in the request in some embodiments, such as the corporation's tax ID number (e.g., EIN) or other information as required by the bank. In some embodiments, the bank may immediately acknowledge receipt of the request; in other embodiments, the bank may respond only when the bank account has been created. Once the bank receives the request from the system to create an account in the name of the corporation, the bank may perform the necessary steps to create the account, and may send a response back to the system. In some embodiments, the response may include parameters such as the new bank account number in the name of the corporate entity, the routing number of the bank that relates to the new account, or other parameters. The response may be in a similar format as the request, e.g., HTTP/JSON, or it may be via email, or via another means or protocol.

Processes for Financing

In some embodiments, a create bridge note process, for convertible note bridge financing, may be performed by the system, which may include one or more of the following steps. Interactions between corporate officers, purchasers, corporate secretaries, representatives, and the system may be described. A corporate officer may select the create bridge note process, fill out an investment questionnaire, and verify that the bridge note was not publicly solicited. The system may assign representative participants and set certain metadata for the note purchase agreement (NPA). The corporate officer may be requested to provide additional key data at this time, including the purchasers of the notes. Once the purchasers are identified, the system may add the purchasers and stock to the NPA metadata, and add the corporate officer to the NPA as the representative of the company. The system may then generate a term sheet.

Once the term sheet is created, the corporate officer may review and collect approvals and signatures. The approvals and signatures may be collected via the system and the approvals may be monitored in real time by the corporate officer or others. Next, a note form document may be generated, and the note purchase agreement may also be generated. The purchaser is then asked to provide metadata for the notes, and the corporate officer is requested to provide other note terms. The system then generates the note document, for review by the corporate officer. The corporate officer then selects shareholders to be requested to approve the note document. The system then generates appropriate board resolutions, shareholder communications, shareholder resolutions, and/or other documents for review and execution, which are then reviewed by the corporate officer and then sent out for signature. The corporate officer may also then define representations and warranties for board and shareholder approval, and these disclosures may be added to the note purchase agreement.

Once the approvals are received from board members and shareholders, at this time, the bank wire information is added by the corporate officer and final review is performed by the corporate officer. Purchasers may then be permitted to sign up, and representatives may be requested to sign. Once all signatures are in place from purchasers, the deliverables may be indicated as closed.

The certificate of good standing and corporate bylaws may be retrieved and used to generate a certification for the corporate secretary to sign. The corporate secretary may then be requested to sign. The corporate officer may then certify the closing conditions, and record the closing date in the note purchase agreement. The note purchase agreement may then be marked as legally active in the system and the notes updated with the closing date and marked as legally active in the system.

Processes for Stock Grants

In some embodiments, a create stock plan process may be performed by the system, which may include one or more of the following steps. A corporate officer may begin the process by selecting a grant type. The system may then present the metadata of the corporate entity to the corporate officer for confirmation/review. The corporate officer may choose one or more grantees, and provide key data and grant terms for the stock grant, upon which the system may generate a grant document based on the provided data, on a document template, and on prior defaults for the entity. After the grant document is generated, the corporate officer is requested to check any constraints that may pertain to the corporate entity, such as whether sufficient authorized shares remain for the stock grant, and to review the stock grant document. The system may also search for a fair market value resolution for the corporate entity. If there is no fair market value resolution, the system may generate a document for a fair market value board resolution. The system may also search for a board resolution or board resolution exhibit regarding an incentive stock option grant plan. If no such plan or exhibit is found, the system may generate a board resolution document for an incentive stock option grant plan, to be approved by the board, with information pertaining to the new stock grant. If more than one plan is found, an appropriate plan may be selected. Once an appropriate plan is found, the plan may be updated with information pertaining to the new stock grant. If the grant plan execution board resolution has not been previously executed and/or a board resolution for grant plan certificate cannot be found, the system may generate an execution board resolution, and generate a board resolution for a grant plan certificate. The approval status of the stock option grant may now be presented to the corporate officer. If the corporate officer agrees with each of the documents, the corporate officer may sign the grant document and other documents. If the corporate officer decides that certain board resolutions need to be passed first, the corporate officer may be able to perform the relevant board resolution approval processes on the system. Once the grant document has been signed, the system waits for the grantee to sign onto the system and accept the grant, at which time the grant is active.

In some embodiments, an employee stock plan grant process may be performed by the system, which may include one or more of the following steps. A corporate officer may initiate the process and may select a grant type. The corporate officer may be prompted to check the address and other data pertaining to the corporate entity and the grant, and to choose the grantee, who may be a user on the system, and may be prompted for additional information regarding the grant terms, such as a number of shares authorized for grant, a vesting period and/or cliff, the type of stock (i.e., restricted or non-restricted), or other terms. The system may check to ensure that the total number of authorized shares is not exceeded, and may check other constraints as needed. The system may then generate the grant document. The corporate officer may then review the grant document for errors and approve the document. The system may also search for a fair market value resolution for the corporate entity. If there is no fair market value resolution, the system may generate a document for a fair market value board resolution. The system may also search for a board resolution or board resolution exhibit regarding an incentive stock option grant plan. If no such plan or exhibit is found, the system may generate a board resolution document for an incentive stock option grant plan, to be approved by the board, with information pertaining to the new stock grant. If more than one plan is found, an appropriate plan may be selected. Once an appropriate plan is found, the plan may be updated with information pertaining to the new stock grant. If the grant plan execution board resolution has not been previously executed and/or a board resolution for grant plan certificate cannot be found, the system may generate an execution board resolution, and generate a board resolution for a grant plan certificate. The approval status of the stock option grant may now be presented to the corporate officer. If the corporate officer agrees with each of the documents, the corporate officer may sign the grant document and other documents. If the corporate officer decides that certain board resolutions need to be passed first, the corporate officer may be able to perform the relevant board resolution approval processes on the system. Once the grant document has been signed, the system waits for the grantee to sign onto the system and accept the grant, at which time the grant is active.

In some embodiments, a change authorized shares process may be performed by the system, which may include one or more of the following steps. First, a manager initiates the process, in some cases providing key data. The manager selects shareholders to be affected. The system then generates a board resolution document based on the provided key data, on a document template, and on prior defaults for the entity. The system then generates a shareholder resolution document and a shareholder consent document using default metadata. The documents may then be sent to a manager for review. Upon approval of the documents, all shareholders may be automatically sent emails to request their electronic signature, and the manager may monitor the status of how many signatures have been collected in real time. Shareholder approvals may also be tracked using the application of tags or other metadata. Once all needed signatures are obtained, the system may find the corporation's certificate of incorporation and generate an amendment document to amend the number of authorized shares. The document is then sent to the manager for signature. Certain evidence may be required by the Secretary of State of a given jurisdiction, such as a copy of prior-filed articles of incorporation, and these evidentiary requirements may be met by retrieval of stored documents in the system. The system may then prepare these documents for submission to the Secretary of State, or submit these documents to a third party or directly, and may subsequently update the number of authorized shares in the system.

In some embodiments, an employee stock option exercise process may be performed by the system, which may include one or more of the following steps. A user, called the grantee, may initiate the process, and the grantee may then be asked by the system how many options she would like to exercise, along with any other key data. Upon receiving this information, the system generates an exercise notice document. The system may also determine whether the grantee has any unvested shares, and whether an early exercise clause is permitted, e.g., via a clause in the corporate entity's incentive stock option plan. In the case that the grantee has unvested shares, the system may generate a restriction document providing conditions over the grantee's option exercise. Once the document or documents are generated, they may be presented to the grantee for signature. The grantee may then be requested to provide evidence that payment was properly tendered to the corporation for the shares. Alternately, a direct electronic payment may be initiated by the system using payment data provided by the grantee, or the grantee may be redirected to another system to cause the electronic payment to occur. Once payment has been established, the system may set the exercise date of the options and may present the exercise to a representative of the corporate entity for approval, which may be another user. Once approval is granted by the corporate representative, the exercise notice may be marked approved, a stock certificate may be generated, and signatures may be requested from the corporate entity's president, board secretary, or any other persons or users as appropriate. Once the certificate is signed, it may be marked as issued and the grantee may be notified.

In some embodiments, an employee stock option Rule 83(b) election process may be performed by the system, which may include one or more of the following steps. The Rule 83(b) election process may be initiated automatically at the conclusion of the issuance of stock or exercise of options to a grantee. When an employee initiates the process, the system may obtain entity metadata from a particular company that the employee belongs to. Next, the system may fill out default values for a Rule 83(b) election document. The system may determine whether the employee has an explicit exercise at this time, and if the answer is yes, information from the exercise may be imported into the process. The employee may then be asked for key data regarding the Rule 83(b) election, as needed based on a template, and the system may then create the document from the document template. The employee may then be required to electronically sign. The employee may then be required to send the document to the Internal Revenue Service, and once completed, upload evidence that the document has been filed to the system, at which time the mail date of the document is updated to the appropriate date and the document is set to active status. The evidence may be tagged with an evidence tag, and the evidence and the Rule 83(b) document may be related with an evidence relationship. Alternatively, the employee may be given the opportunity to upload an existing Rule 83(b) election document, and, if necessary, to re-sign the document.

In some embodiments, a fair market value setting process may be performed by the system, which may include one or more of the following steps. According to Section 409A of the Internal Revenue Code, stock option grants have an exercise price at or above the fair market value of the company's common stock on the date such grant is made. The fair market value of a company's stock may be established by a company's board of directors. A corporate officer may start the process by selecting a corporate entity and/or a document source. The system may search for any existing fair market value board resolution, as well as any default board resolution values, for use in determining key values for a new fair market value board resolution. The corporate officer may be prompted to indicate whether a new document should be generated or whether an existing fair market value resolution is to be uploaded. If the corporate officer chooses to upload an existing fair market value resolution, the system may update the fair market value for the entity using the uploaded document as the source document for the fair market value core record. Any prior fair market value board resolutions may be marked inactive.

If the corporate officer chooses to generate a new fair market value resolution, the corporate officer may be prompted for additional key data, after which the system may generate a new fair market value board resolution pursuant to Internal Revenue Code Section 409A. However, on its own, the board resolution is not sufficient to set the fair market value of the corporate entity. Under IRC 409A, "safe harbors" exist for a new company or for a company that relies on a valuation from a third party firm meeting certain objective standards. In many circumstances, a small business or startup may wish to rely on these safe harbors to reduce administrative burden as well as risk. The system may permit an entity wishes to rely on these "safe harbors" by prompting the corporate officer to upload proof that such a valuation has occurred. One or more documents may be uploaded to the corporate data store for compliance with any future audit.

Once one or more documents are uploaded to establish the corporate entity's compliance with IRC 409A, the corporate officer may be prompted to review and release the new fair market value board resolution to the board. The board resolution may be sent to the other board members for approval, during which time the corporate officer may monitor the approval status of the board resolution. Once a sufficient number of board members have approved the new board resolution, any prior fair market value board resolution is marked as inactive, the new fair market value board resolution is marked as active, and the fair market value of the shares of the corporate entity are stored in the system, with the source of the fair market value being identified as the fair market value board resolution.

Processes for Bank Transaction Facilitation

In some embodiments, the system may be enabled to initiate transfer of funds from each of the recipients of a stock grant to the company's bank account, in some embodiments. Initiating transfer of funds in this way may be performed as follows. According to the operation of a workflow as defined by the system, a recipient of a stock grant may be notified that he or she is required to make payments to the company in order to purchase the stock grant, in some embodiments. In some embodiments, the notification may be omitted. In some embodiments, individual grantees may specify their preferences and/or information about the bank accounts which they hold, in order to enable the transfer of funds. In other embodiments, the grantees may be enabled to notify the system when the funds have been transferred. When the workflow is configured to request information about bank accounts directly from grantees, the system may use the information received from the grantees about their personal bank accounts, together with information about any bank accounts in the name of the corporation, including bank accounts created at the initiation of the system, to request, of the bank, a transfer of funds from each grantee's bank account to the bank account of the system, in some embodiments. The workflow may be configured to retrieve, from appropriate document records defined by the workflow, the initial stock price or relevant option price of the corporation and the number of shares/options being transferred. The workflow may then multiply the price with the number of shares and/or options, and may then request the transfer of the appropriate amount of funds from the grantee's account to the corporation's account from the bank, in some embodiments.

The transfer of funds may be specifically authorized by the grantees using the system, in some embodiments. In some embodiments, cryptographic security may be employed between the system and the bank's systems. In some embodiments, cryptographic signing may be used to authorize the system to perform the transfer. In some embodiments, the authorization may take the form of a document, and may be stored as a document record in the data store, with the document records including various entity records including the amount authorized, the bank account number of the grantee, the bank account number of the grantor (i.e., the corporation), and/or other entity records.

In some embodiments, employees may exercise options or purchases of stock or restricted stock awards (RSAs) by authorizing the system to perform purchases by automated clearing house (ACH)/wire transfer. In some embodiments, an investor as part of note or equity financing may be given the opportunity to approve wires as part of signing of a stock purchase agreement. In other embodiments, wires may be configured to trigger automatically upon deal close, according to workflows. In some embodiments, whether approval is required may be determined using a workflow. In some embodiments, a shareholder may be enabled to initiate a Sale of Stock workflow. The Sale of Stock workflow may initiate a direct transfer of funds via ACH or wire to the stock seller's account. In some embodiments, investor capital calls may be handled through the system and wires automatically initiated based on pre-agreed upon dollar amounts, which may be stored in entity records and associated with document records. In some embodiments, the system may have the ability to verify payment by looking for received funds in corporate account, and/or the ability to verify repurchase payment by looking at outgoing transfers from company to shareholders.

In some embodiments, for one or more of the processes above, a manager may be asked to select a document source specific to a particular corporate entity, or to enter or select entity metadata. This may occur in particular when a user has a manager role for more than one company.

In some embodiments, generation of a document may be based on key data received from a user, system-wide defaults previously stored in the system, defaults previously provided for the entity or process type, and/or on a document template, in addition to the parameters described above. In the description above, the term "key data" refers to some or all data or information relevant to a given process.

In some cases, one or more of the relevant persons for a given process, apart from the initiating or controlling user, may not be a user on the system. Some embodiments may permit non-users to participate in the processes described herein by the use of ordinary paper documents for review and approval, where these documents may be generated by the system. A user of the system with administrative approval, or a corporate officer, or any user, may upload evidence of the review and/or approval of a document to the system where appropriate.

In some embodiments, each of the preceding processes may include one or more steps from other processes described above, or steps from other processes or steps not described, in any order. Each of the preceding processes may be broken into multiple processes or combined.

Drawings

FIG. 1 shows a network diagram of a platform for providing the services described herein, in accordance with some embodiments. Business operating system platform 101 may include load balancer 102, app tier 103, queue tier 104, worker tier 105, database tier 106, authentication tier 107, document signing tier 108 and messaging tier 109. Each tier may include one or more servers that may be virtual servers or physical servers. The servers may be activated or deactivated as needed based on load parameters that may be determined by the business operating system, wherein the load parameters include CPU load and network bandwidth utilization.

Load balancer 102 acts as a gateway between the remainder of platform 101 and the public Internet, in some embodiments. Load balancer 102 also may allocate incoming requests among servers in app tier 103. In some embodiments, an HTTP load balancer such as nginx may be used.

App tier 103 includes one or more web servers 103a, 103b for receiving web requests via Hypertext Transfer Protocol (HTTP), in some embodiments. The web servers may then determine what tasks, if any, need to be distributed to either a database tier 106 or a queue tier 104. The web servers may then return fully- or partially-rendered web pages to a requesting web browser. As the web browsers are behind load balancer 102, different servers may service different web requests. In some embodiments, the web servers may be web application servers, and the applications running on them may be precompiled, linked at runtime, Common Gateway Interface (CGI) applications, modules executed by a web server process, or otherwise executed. The web servers may also integrate their own load balancing, in some embodiments. In some embodiments, load balancing may occur only at 102, only at 103, or at neither, or both points in the system.

The queue tier 104 and the worker tier 105 may include one or more servers, and may include a facility to activate or deactivate servers as needed to meet the needs of the service, in some embodiments. The queue tier 104 may receive requests from the app tier 103 and may identify sub-tasks, which may then be sent to worker tier 105 to be executed. The queue tier 104 may use a queuing messaging protocol such as RabbitMQ for assigning tasks to processes at the worker tier, in some embodiments. The queue tier 104 may use the Celery queuing software with well-known queuing algorithms to provide reliable service.

The worker tier may execute sub-tasks, such as rendering documents, executing processes, requesting data from database tier 106, and sending emails, in some embodiments. The sub-tasks may execute at the worker tier as threads, processes, or via another processing abstraction that is capable of being processed in parallel. The sub-tasks may involve one or more requests for data from other servers or network nodes. Rendering documents may cause portions of documents to be rendered to text, Hypertext Markup Language (HTML), partial HTML (HTML snippets), JavaScript, JSON, Portable Document Format, the ReportLab report markup language (RML), or another format. Rendering documents may also involve combining data stored in core records with data stored in or generated by document templates, as described above. In some embodiments, reports, including reports generated by ReportLab from RML, and including audit reports and logs, may be generated. In some embodiments, documents may be generated based on user input and then sent back to the app tier 103 for authentication by the authentication tier 107.

Execution of processes may involve the use of processes stored as eXtensible Markup Language (XML), XML process definition language (XPDL) workflows, or other data that define the process, and may involve the creation of or modification of entity records, core records, stakeholder records, or other records. Emails may be sent by the worker tier to, for example, send reminders about approaching deadlines or to send password reset messages. When worker tier 105 completes work and/or receives an appropriate response from one or more other servers, it sends a message, which may be HTTP JSON, to a messaging tier 109, which is responsible for assembling a reply and sending it back to a requesting user via load balancer 102.

Database tier 106 may receive requests for data from worker tier 105, and may retrieve information stored in the form of one or more core records, entity records, or stakeholder records. Data may be written to one or more databases as serialized JSON objects. The database tier 106 may use a database that enables JSON storage, such as PostgreSQL 9.4 or above using the JSONB data type. Data from multiple entities may be distributed across database servers in various ways. In some embodiments, all data for a particular corporate entity may be placed on a single database server, enabling sharding of large databases on a per-entity basis and providing added security for each entity. Data may be requested from the database tier by a worker tier or by the app tier directly. When data is needed to perform a task or sub-task, in some embodiments, the worker tier may cause data to be retrieved from the database tier. In other embodiments, the queue tier may create data retrieval requests from the database tier, or both the queue tier and the worker tier may send requests to the database tier. When data is created by the worker tier, for example, an HTML snippet, a complete PDF file, or a new or modified entity record in a corporate entity, data may be sent to and stored in the database tier 106 as JSON. In some embodiments, a cache or alternative data structure server such as memcached or Redis may be used for improving the read/write performance of database tier 106.

Also shown are authentication tier 107 and document signing tier 108. Authentication tier 107 serves to identify whether the logged-in user has the proper credentials to perform a particular process or sign a particular document. Authentication tier 107 may use the lightweight directory access protocol (LDAP) within an organization, or using an LDAP server (not shown), to authenticate a user. Authentication tier 107 may use the Red Hat FreeIPA suite, which includes LDAP, for managing identity, policy, and audit functions, including for keeping an audit log. Authentication tier 107 may also use Kerberos to permit users and other nodes securely prove their identity, or to securely prove the identify of the platform to external providers. Authentication tier 107 may permit the use of two-factor authentication. Document signing tier 108 may be responsible for communicating with a third-party system, such as GlobalSign, to cause the third-party system to use a root-authenticated certificate to cryptographically sign the document after it is finalized, using Adobe Certified Document Services (CDS), to prevent modification of the document. The cryptographically-signed document may be saved to database tier 106 as a PDF associated with a document object.

Document signing tier 108 may use a Java library to communicate with a secure signing service located at an external network provider. Document signing tier 108 may include modules for interpreting both Java and JSON, for communicating with services internal to system 101.

One or more of the above application servers, web servers, load balancing servers, database servers, or other servers may be running a Linux operating system. In some embodiments, when used in a production role, the servers may be configured to have a minimum of services active, excepting only the specific services described above. This has the advantage of increased security, which is desirable when performing corporate processes and providing secure authentication services. In other embodiments, the servers may have additional active services. In some embodiments, a virtual private network (VPN) server 111 may provide the sole connection to the outside Internet for the system, thereby acting as a security gateway. In other embodiments, users may connect directly via network 110 to the system. Whether or not a VPN is used as a security gateway, access to applications may be limited through the load balancer as a gateway.

In some embodiments, one or more of the servers described may operate using the Linux operating system, and/or using an Ubuntu distribution of Linux. Various messaging protocols may be used between tiers, including for message passing; for example, RabbitMQ and Celery queuing and message passing middleware may be used. HTTP and JSON may be used as protocols for transmitting data. The web servers may use web applications written in Python in conjunction with a web server, such as the Nginx web server. Caching may be performed at one of the app tier, queue tier, or database tier using a web cache or object cache such as Redis. Servers as described herein may be virtual servers. Access to the platform may be partially limited to or solely through a virtual private network (VPN).

Figure 2:
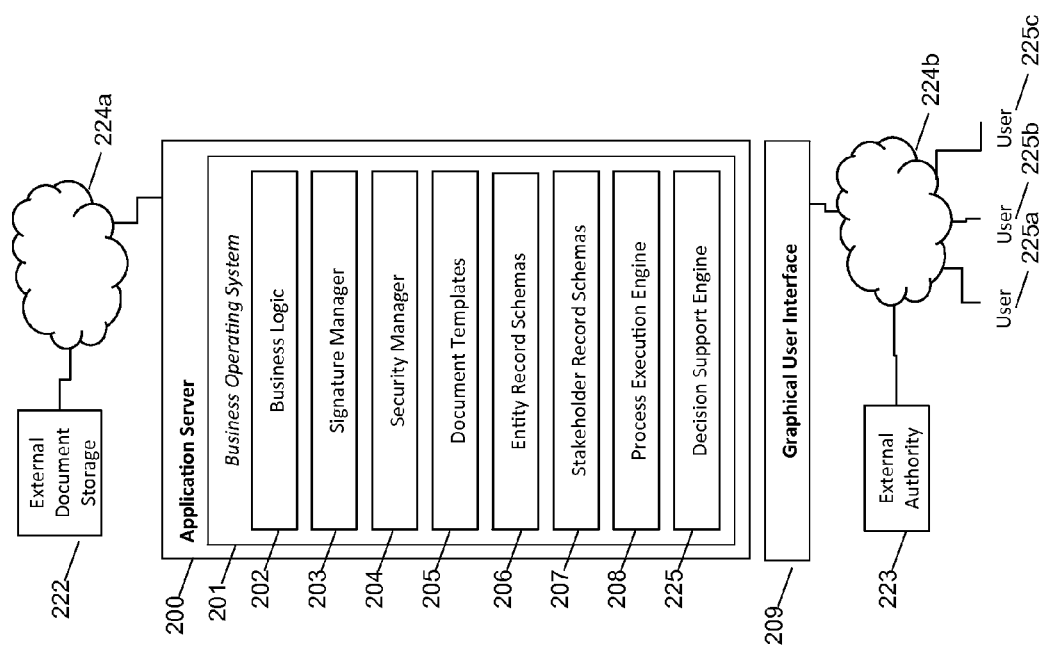
FIG. 2 is a schematic diagram of an application server, in accordance with some embodiments.

FIG. 2 is a schematic diagram of an application server, in accordance with some embodiments. Application server 200 may be an application server, or a group of application servers, such as the app tier 103 shown in FIG. 1. Application server 200 includes a business operating system 201, which further includes business logic 202, signature manager 203, security manager 204, document templates 205, entity record schemas 206, stakeholder record schemas 207, process execution engine 208, and decision support engine 225. Business logic 202 may be one or more business processes, configured to be executed by process execution engine 208. Examples of a business process are: incorporation; nomination of a board; creating board resolutions; creating a stock plan; granting stock to an employee; and identifying a consultant or an employee, among other examples. Signature manager 203 may provide functionality and services for storing electronic signatures, retrieving prior-stored signatures, and reading and writing quick response (QR) codes. Security manager 204 may provide functionality pertaining to the security of the system, such as logging, transaction monitoring, authentication and authorization, auditing and reporting, as well as interfacing with third-party security functionality and services.

Document templates 205, entity record schemas 206, and stakeholder record schemas 207 provide the framework for data to be stored on the system. Document templates 205 provide templates for a variety of types of documents. As the documents are intended to be legal documents for a company's business processes, some or all of the document templates may be authored by attorneys according to state and federal law, with particular attention to Delaware corporate law. The document templates may be predefined and inalterable, or they may be alterable such that a company may make changes to the document templates by uploading new templates, or the document templates may be individually alterable. The entity record schemas 206 may include schemas for various types of corporate entities, such as S-corporations, C-corporations, limited liability corporations and partnerships, and may include parameters such as state of incorporation, address of incorporator, address of corporation, primary address, board membership, corporate structure, and other parameters. The stakeholder record schemas 207 may define a stakeholder as a person within the context of the entity, with contact information for the person such as address, email address, and phone number(s), and may also define a stakeholder as having one or more roles, such as board member, board secretary, shareholder, corporate officer, or other roles. A single stakeholder may hold more than one role; a user may also hold one or more roles for one or more corporate entities.

Decision support engine 225 may provide analytics for real-time reporting during the execution of a business process, based on data available to the business operating system. For example, if multiple people known to the business operating system have the title "Chief Engineer," the system may be able to compute basic analytics on this set of people to provide information regarding their average and median salary, stock compensation, etc., in real time such that at the time a new hire contract is being created on the system, the relevant information is provided to the user. Decision support engine 225 may rely on external document storage 222 for this information, and may also rely on business logic 202 and process execution engine 208 to determine when the decision support engine 225 may be invoked.

Application server 200 may interact with external document storage 222 via network 224*a*. In some embodiments, external document storage 222 may be for storing generated documents in binary format only, such that a user may be able to retrieve relevant legal documents at any time without use of the business operating system 201. The external document storage provider may be, for example, Box.com, Dropbox, Google Drive, a private WebDAV file store, or any other cloud-based content storage solution. In other embodiments, external document storage may be used for storing all information, including information formatted according to document templates 205, entity record schemas 206, and stakeholder record schemas 207. Application server 200 may also interact with external authority 223 and users 225*a*, 225*b*, 225*c* via network 224*b*. An external authority 223 may be provided for authenticating users on the system. For example, an external authority may provide two-factor authentication support such that a user may be authorized by the external authority before being granted access to business operating system 201. Graphical user interface 209 may provide a visual interface to business operating system 201; the user interface 209 may appear in a web browser and may combine results and outputs from multiple parts of business operating system 201 into a single outputted HTML page. In some embodiments, the HTML page may contain functionality as well, such as input validation functionality performed in JavaScript, in order to provide higher-quality data to the underlying system.

Figure 3:
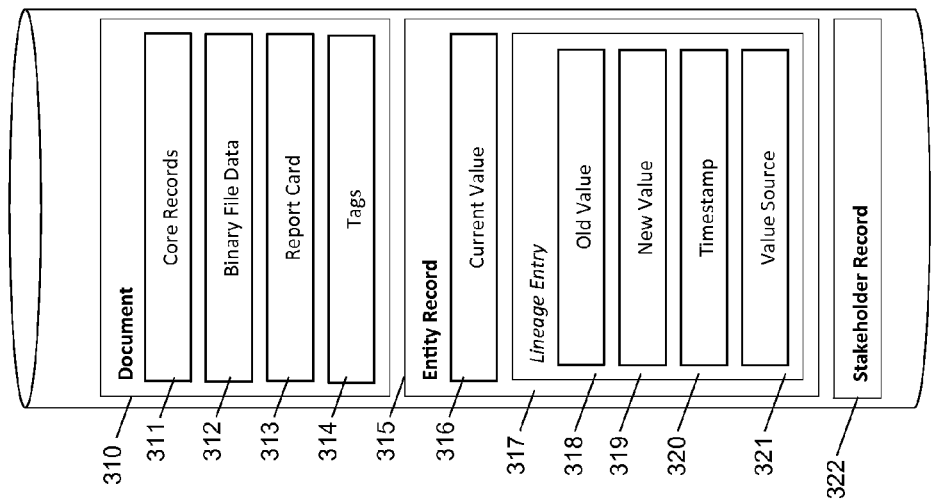
FIG. 3 is a schematic diagram of a database server, in accordance with some embodiments.

FIG. 3 is a schematic diagram of a database server, in accordance with some embodiments. Document 310 includes core records 311, binary file data 312, report card 313, and tags 314. Entity record 315 includes current value 316 and lineage entry 317, which includes old value 318, new value 319, timestamp 320, and value source 321. Stakeholder record 322 is also shown. Each of the above data objects is stored in a database at a database server, and may be stored in a relational database, such as PostgreSQL, in a non-relational manner, such as in the JSONB format. In some embodiments, data elements may comprise references to other data objects. For example, the binary file data 312 in document 310 may be actual binary file data stored in a database, or may be a reference to binary file data stored outside of a database, for example, as a uniform resource indicator (URI) indicating the location of a file accessible via HTTP from another server. Also, the value source 321 that is part of lineage entry 317 may be a reference to another object, such as another document object, and may not be the object itself. In some embodiments, an array of lineage entries may be stored in entity record 315.

Document 310 is intended to permit multiple core records 311 to be associated with the document. For example, a certificate of incorporation would have at least a core record for the company's address and another core record for the founders of the company. In some embodiments, the report card may or may not be present; when present, the report card may be updated at the time the document object is saved or at a later time based on when processing resources are available for calculating the trustworthiness of the data associated with the document. In some embodiments, a single binary file data object 312 is associated with one document object 310. Documents may be associated with entity records as well, in some embodiments, In some embodiments, tags 314 are free-form text and may be human-readable. Multiple tags may be associated with a single document. In some embodiments, the tags may have a hierarchical structure to facilitate search and retrieval. Certain tags may be special; for example, the "active" tag indicates to the system that a document is legally in effect, and may be automatically updated when a new document is created or when an older document is superseded; also, entity records may be associated with documents as tags, in some embodiments. Superseding of a document may be quickly determined by the system performing a search for the type of document, e.g., "stock option plan," to find all documents with a particular type for a particular entity record.

In some embodiments, an entity record 315 may include both a current value 316 and a lineage entry 317. Although an entity record contains a current value 316, the entity record's current value 316 duplicates the value stored in the lineage entry. This facilitates retrieval of the value without dereferencing any references in the lineage entry, and may be thought of as a cached value. Lineage entry 317 includes at least a value source 321, to indicate that the lineage of the current value is originally from that other object. Lineage entry 317 may also include old value 318, which is the value that was previously stored in the entity record; new value 319, which is the same as the current value 316 and the value of that entity in value source 321; and a timestamp 320. Current value 316 may be thought of as a cached value. Current value 316 points to an up-to-date value of the core record, even if the core record has been modified.

Value source 321 may be a reference to another object, such as a document. For example, if a stock option plan was put into place at a prior date, the number of authorized shares of a corporation would be determined by the active stock option plan document, so although the entity record for the corporation would include the number of shares of the corporation, it would also indicate that the number of shares originated in the active stock option plan document. An auditor would thus be able to determine the source of the number of shares upon later review.

In some embodiments, a value source 321 may be a stakeholder record and not a document. This may occur when a value is manually entered without reference to a prior document, or when a document is uploaded and does not contain generated values in the system.

In some embodiments, stakeholder record 322 may include one or more roles (not shown), as well as basic information about the stakeholder, such as name, address, phone number, email, and so on (not shown). A role indicates what actions that may be performed or initiated by the stakeholder.

Figure 4:
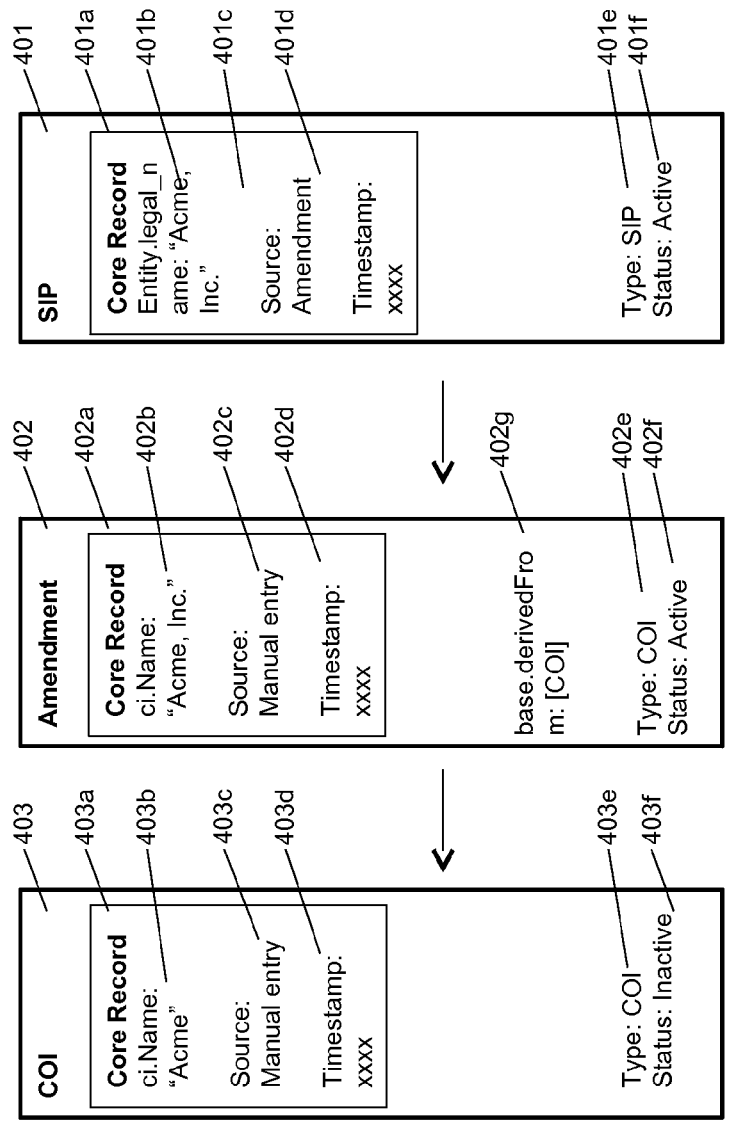
FIG. 4 is a schematic diagram of a data model, in accordance with some embodiments.

FIG. 4 is a schematic diagram of a data model, in accordance with some embodiments. In the scenario depicted in FIG. 4, an initial certificate of incorporation 403 has been superseded by an amendment 402. Stock incentive plan ("SIP") 401 contains the up-to-date value stored in the entity record at the time the stock incentive plan 401 is made. Document 403 is a certificate of incorporation, with core record 403*a* that further includes ci.name 403*b* ("Acme"), source 403*c* ("manual entry"), and timestamp 403*d*. Document 403 also includes a type parameter 403*e* ("COI"), and a status 402*f* ("Inactive"). Document 402 is an amendment, with core record 402*a* that further includes ci.name 402*b* ("Acme, Inc."), source 402*c* ("manual entry"), and timestamp 402*d*. Document 402 also includes a type parameter 403*e* ("COI"), and a status 403*f* ("Active"), as well as a reference 402*g* to certificate of incorporation 403 ("base.derivedFrom: COI"). Parameter 402*g* may be used for amendments, or for documents that derive from other documents, generally. Stock incentive plan 401 includes a core record 401*a* that itself includes entity.legal name 401*b* ("Acme, Inc."), reflecting the corrected name in amendment 402, for the company name at the time the stock incentive plan document 401 is created. Core record 401*a* also includes source 401*c* and timestamp 401*d*.

It is noted that each of the documents 401, 402, 403 shown in FIG. 4 do not need to be modified after execution and finalization. As with paper documents, each document contains specific data that is only guaranteed to be valid at the time the documents are made. The entity record contains an up-to-date copy of the current information for the corporate entity, and references individual documents to enable auditing. Taken together, the system may provide a cache of all information pertaining to the corporate entity valid at the present time; this information is derived from the documents stored in the document database. As part of the process that generates any new document, a system step may update the entity record as necessary. Specifically, the entity record may be updated after approval and finalization of a document. As new documents supersede old documents, those old documents may be marked inactive, and the new documents marked active. At any time, a search on the status tag can be used for retrieving all active documents for the corporate entity.

Figure 5:
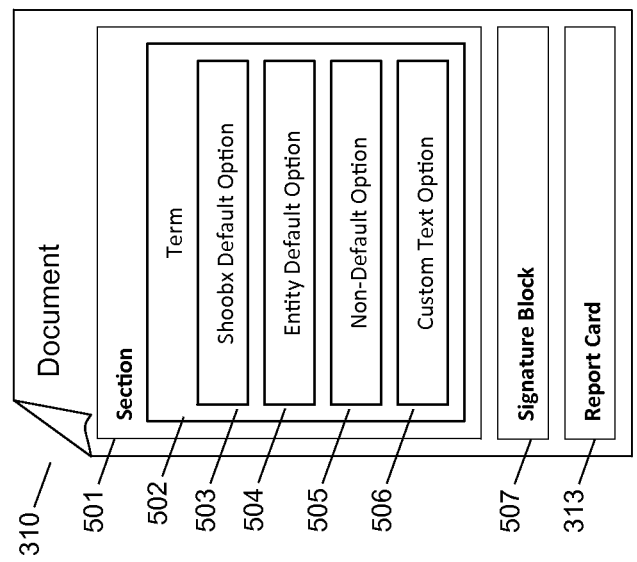
FIG. 5 is a schematic diagram of a document, in accordance with some embodiments.

FIG. 5 is a schematic diagram of a document, in accordance with some embodiments. Document 310 includes section 501, which further includes term 502, which itself further includes options, specifically, default option 503, entity default option 504, non-default option 505, and custom text option 506. Document 310 also includes signature block 507 and report card 313. Term 502 may be a core record; each core record may have one or more default options, as shown in this figure. Default option 503 may be a default value that relates to the specific core record type. Entity default option 504 may be a default that is specific to the entity record and may be stored or cached with the entity, in some embodiments. Non-default option 505 is a value that is not a default option; in many cases, certain key data, such as a number of shares to be created upon incorporation, may be requested from a user at the time a process is performed, and such values may be stored as non-default options. Custom text option 506 may be any other value, including a value that is known to take on one or more values from a specific set of possible values, in some embodiments. Signature block 507 will be described below at FIG. 13. Report card 313 includes information that may be used to perform an audit and/or assess the subjective quality of values stored in document 310, and will be further described below at FIG. 19.

Figure 6:
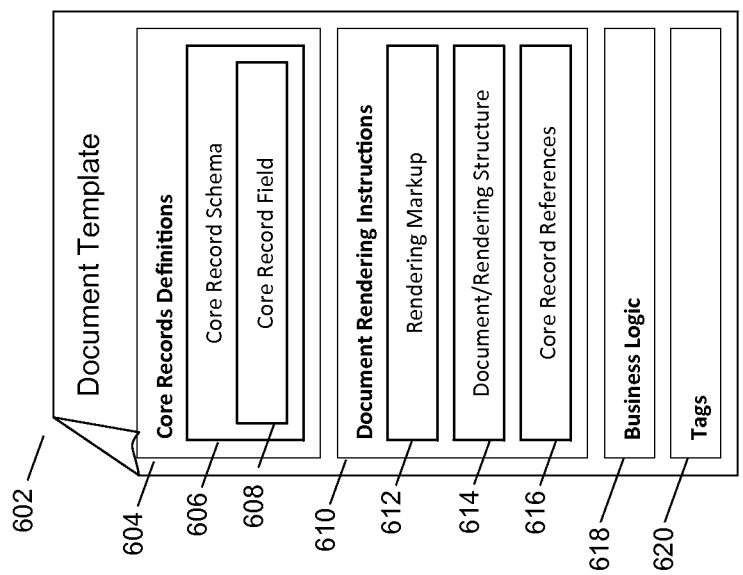
FIG. 6 is a schematic diagram of a document template, in accordance with some embodiments.

FIG. 6 is a schematic diagram of a document template, in accordance with some embodiments. Document template 602 includes core records definitions 604, which itself includes core record schema 606, which includes core record field 608. Document template 602 also includes document rendering instructions 610, rendering markup 612, document/rendering structure 614, and core record references 616. Document template 602 also includes business logic 618 and tags 620.

Document template 602 is a template used for generating a document using the system. Business processes stored in the system rely on one or more document templates to generate various different types of documents. The documents themselves include sections, terms, and core values, as described elsewhere herein and above regarding FIG. 5.

Document template 602 includes at least the following elements. First, a document template includes a list of core records that are part of the document, which here are shown as core records definitions 604, core record schema 606, and core record field 608 (as well as core record references 616). In some embodiments, the schema 606 is not stored with the document template. The list of core records is an important part of the document. For example, an incentive stock option policy will have various parameters, including a number of options, a vesting schedule, the presence or absence of a vesting cliff, the presence or absence of an early exercise clause, etc. These parameters should be written into the document. The category of document template may define the set of core records in a document template, in some embodiments. Multiple templates may be provided for any reason, including for providing for different entities' preferred values.

Document rendering instructions 610 is the set of instructions and data that, when combined with values corresponding to all key records associated with the template, enable the system to generate a document using the document template, in some embodiments. In some embodiments, document rendering instructions 610 would include, for example, boilerplate text of an agreement and its formatting (as rendering markup 612), a document structure, and references to the core records defined in core record definitions 604. Document rendering instructions 610 may be used to render the document for viewing in the user interface, for rendering as HTML, or for rendering as a PDF file to be stored and/or printed. In some embodiments, document template 602 may be an eXtensible Markup Language (XML) document, or may contain an XML document.

Business logic 618, in some embodiments, is logic that may be executed at the time a document is created using document template 602. Tags 620 are general-purpose, free-form text that are used for storing various system-wide information, such as document status (i.e., active or inactive), document type, and other parameters.

Figure 7:
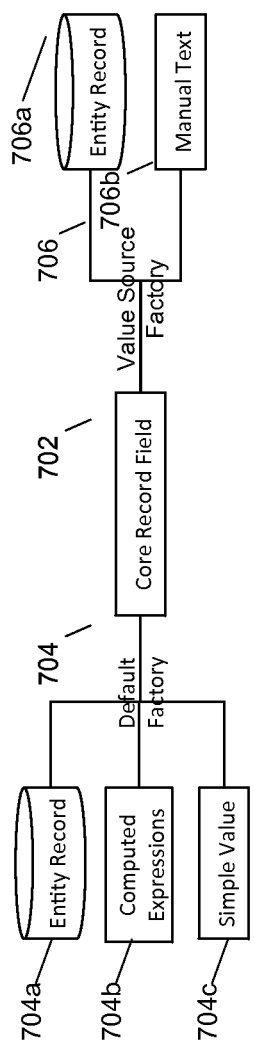
FIG. 7 is a schematic diagram of a core record, in accordance with some embodiments.

FIG. 7 is a schematic diagram of a core record, in accordance with some embodiments. Core record field 702 includes default factory 704 and value source factory 706. For each core record, default values for the data in the core record may be provided by one or more default factories associated specifically with that core record, while other parameters in each core record, such as the provenance or lineage, may be provided for by the system. Default factory 704 includes entity record 704a, computed expressions 704b, and simple values 704c. Entity record 704a may be a reference to an entity record, which may have default values for a new core record. For example, the name of the company would be stored in the entity referred to by entity record 704. Computed expressions 704b may involve information that may be programmatically derived. For example, given a number of shares and a fair market value, a default factory could compute the amount of cash required to exercise a stock option to purchase that number of shares. Simple values 704c are values that can be used directly as defaults for the given core record.

Similarly, in some embodiments, value source factory 706 includes entity record 706a and manual text 706b, but unlike the default factory, which provides default values for data in the core record, value source factory 706 provides default sources for those values, i.e., defaults for provenance and/or lineage parameters. Entity record 706a is similar to entity record 704a in that value source factory entity record 706a instructs the system to assign to a given core record the default value source that is found in the entity record. Manual text 706b is similar to simple value 704c in that value source factory entity record 706b instructs the system to indicate that the source of this value is manual text entry; in some embodiments, manual text entry may be accompanied by information about the stakeholder that made the manual text entry. In some embodiments, a core record can be a valid value source factory.

Figure 8:
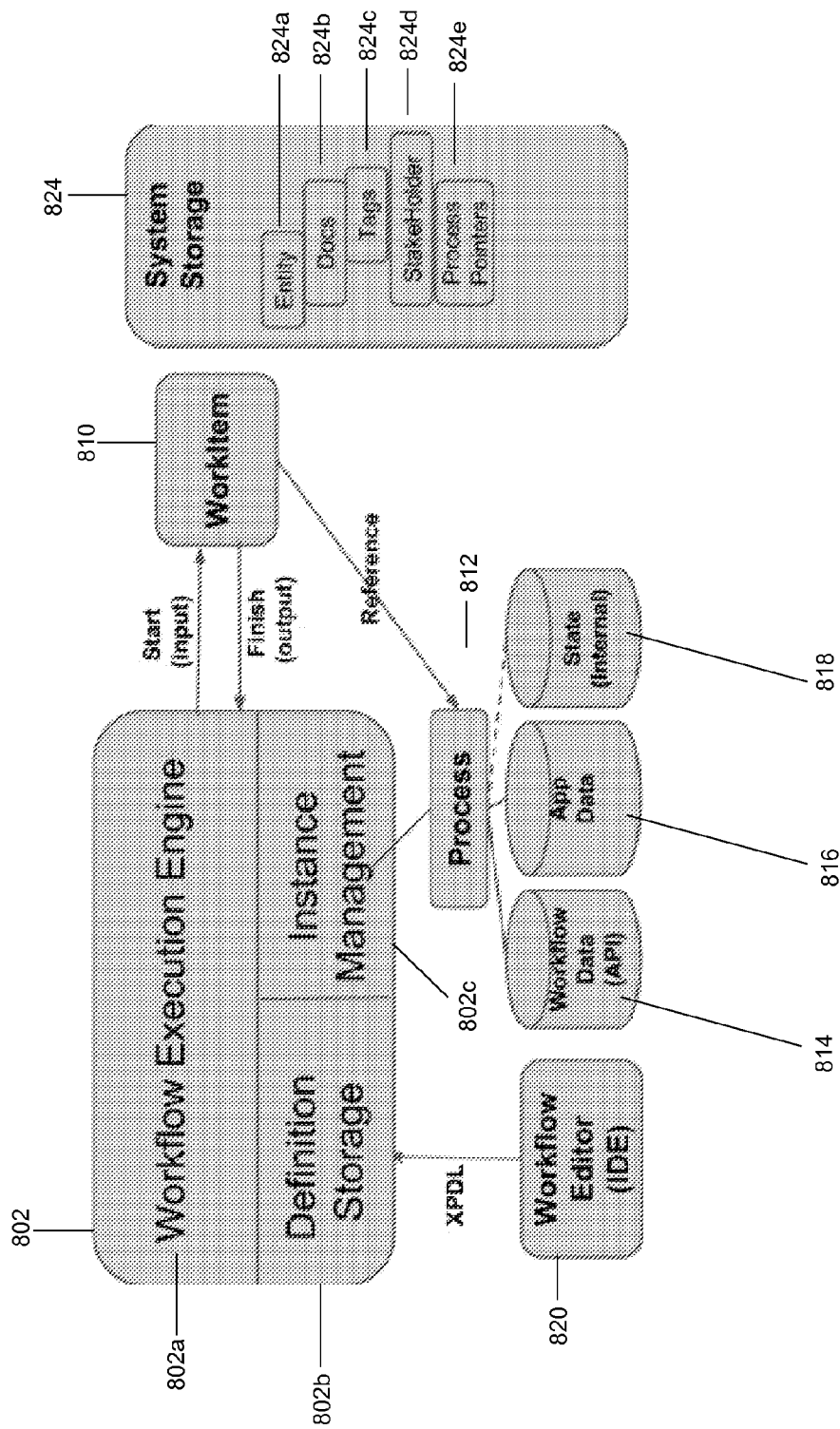
FIG. 8 is a schematic diagram of a workflow execution engine and components relating thereto, in accordance with some embodiments.

FIG. 8 is a schematic diagram of a workflow execution engine and components relating thereto, in accordance with some embodiments. Workflow execution system 802 includes a workflow execution engine 802a, definition storage 802b, and instance management 802c. System storage 824 includes entity 824a, and associated with entity 824a, documents 824b, stakeholders 824d, and process pointers 824e, as well as tags 824c associated with documents 824b. Workflow editor 820 is coupled to definition storage 802b and is operated upon by a lawyer 822. Process 812 is in communication with instance management 802c and also with workflow data store 814, app data store 816, and state store 818.

In operation, in some embodiments, workflow execution system 802 may include an engine 802a that performs processing of business logic, generates defaults, combines stored data from other records with data for a current process, executes instructions in stored procedures and document templates, and sends information to a user interface (not shown) for display to the user. Workflow execution system 802 may also include definition storage 802b, for storing one or more business processes in XML Process Definition Language (XPDL) format and for communicating with workflow editor 820; and instance management 802c, for managing one or more processes that are currently executing. Workflow execution engine 802a may manage one or more queues for work, and may send work items 810 to a worker system (not shown) for processing. Work items 810 may be sent to the worker system with or without all the input required; the worker system may be responsible for completing work items, including searching for input as needed, in the order queued or in another order if necessary for parallel processing.

In some embodiments, each workflow may require a process 812 to be created that has workflow data 814, app data 816, and state 818. Workflow data 814 may store data available to the workflow engine, app data 816 may store data relevant to application execution, and state 818 may store data internal to process execution, where all of these data relate to a specific business process received via workflow editor 820 and definition storage 802b. More than one process may be created, allowing for parallel processing over multiple business processes and entities.

In operation, lawyer 822 may use workflow editor 820 to administer system 802. In some embodiments, the workflow editor 820 may be an integrated development environment (IDE), either provided as desktop software or web-based application software. The lawyer may be enabled to register a new process definition (and in some embodiments, by uploading an XML Process Definition Language (XPDL) file). The lawyer may also be enabled to register a new corporate action tied to an already-registered process definition, in the process defining which roles have access to the new corporate action. In some embodiments, lawyer 822 may also use a template building text editor (not shown) in conjunction with an administrative web-based application to register a template with an ID, to upload a new document template, to extract and validate schemas from the uploaded document template, and to set entity and stakeholder metadata references for the new template. An attorney or lawyer is not needed to perform any of these steps and/or tasks, but "lawyer" is used in a representative fashion to indicate what types of users may typically be tasked with these operations.

Figure 9:
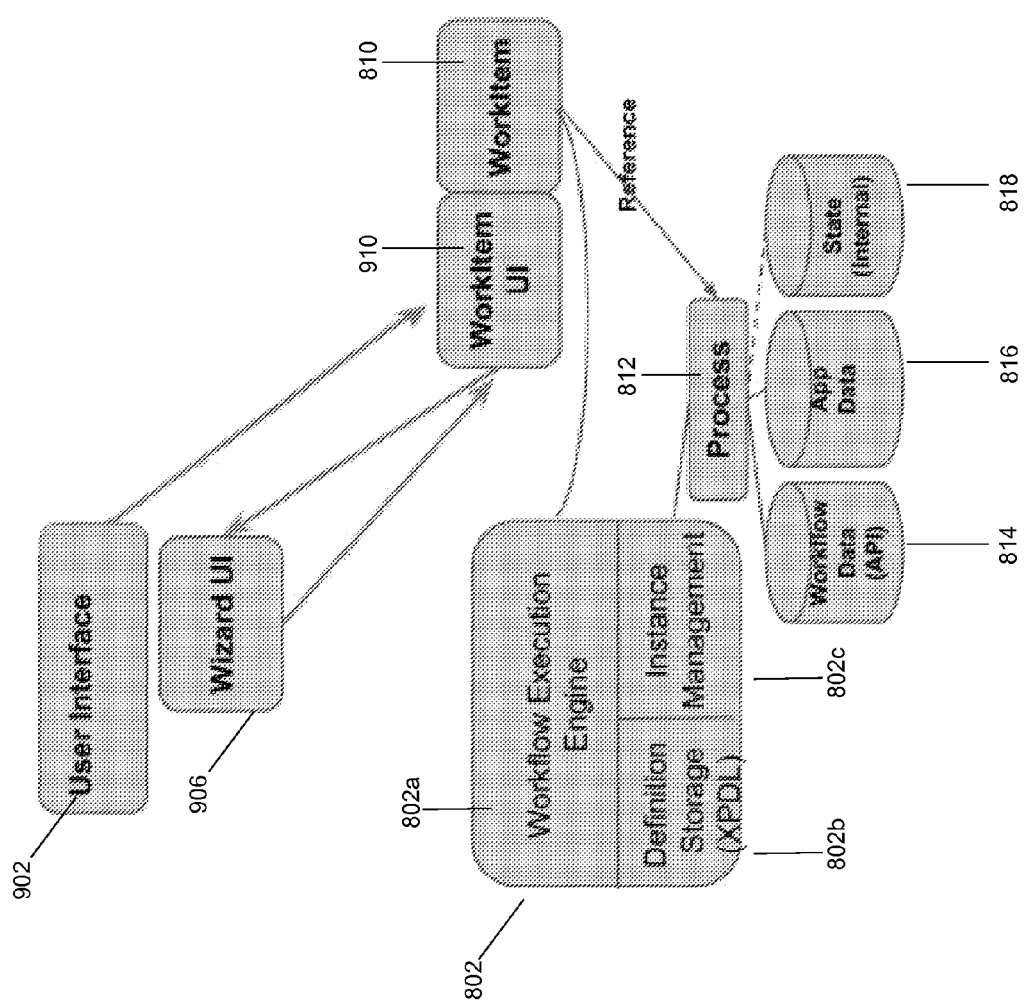
FIG. 9 is a schematic diagram of a user interface in conjunction with a workflow execution engine, in accordance with some embodiments.

FIG. 9 is a schematic diagram of a user interface in conjunction with a workflow execution engine, in accordance with some embodiments. Workflow execution system 802, including workflow execution engine 802a, definition storage 802b, and instance management 802c are shown, as are system storage 824 with entity 924a, and associated with entity 924a, documents 924b, users 924d, and process pointers 924e, as well as tags 924c associated with documents 924b. Process 812 is also shown, and is again in communication with instance management 802c and also with workflow data store 814, app data store 816, and state store 818. Also depicted are user interface 902, operated upon by corporate officer 904; wizard user interface (UI) 906; work item 810; and work item UI 910.

In operation, user interface 902 may display active work items relevant to a user (i.e., corporate officer 904). The user may select a work item for execution (i.e., "document requires signature"), causing the work item 810 and work item UI 910 to receive work. Work item 810 interoperates with workflow execution system 802 and process 812 to perform necessary data management tasks. Work item UI 910 communicates with wizard UI 906, if needed, and renders (or causes wizard UI 906 to render) any required visual indications of process context, completion state, wizard flow, user-directed information requests, or any other user interface elements. Processing continues at work item 810 until the workflow execution system 802 indicates that the process is complete.

Figure 10:
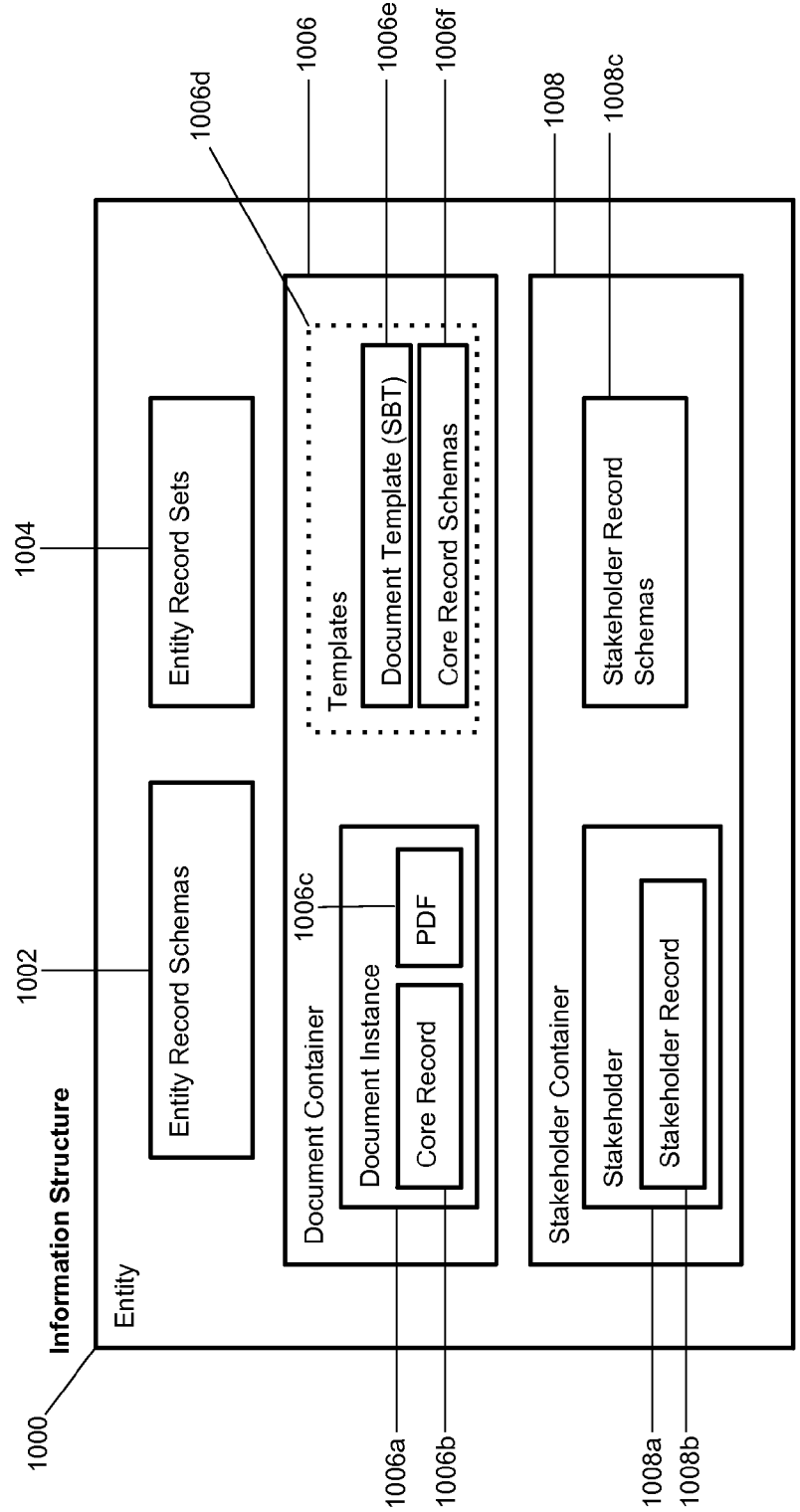
FIG. 10 is a schematic diagram of an information structure, in accordance with some embodiments.

FIG. 10 is a schematic diagram of a information structure, in accordance with some embodiments. In some embodiments, an entity 1000 is a higher-level object, and includes entity record schemas 1002 and entity record sets 1004, as well as document container 1006 and stakeholder container 1008. In other embodiments, documents, processes, and/or stakeholders may exist as peers to the entity object, and may be associated with but not contained within the entity object.

Entity record schemas 1002 may be a list of all possible data objects on the system with a schema for each, and entity record sets 1004 may be a list of entity records specific to the entity 1000. Document container 1006 may include all documents that are associated with entity 1000, and each document instance 1006a may include core record sets 1006b, containing all core records for that document instance, and also a version of the document in PDF format 1006c. Document container 1006 also includes all templates 1006d, with each template being stored with both a document template 1006e and a core record schema 1006f defining what data may be used for that document template.

Stakeholder container 1008 may include a set of stakeholder records 1008a, each including a stakeholder record set 1008b that contains all stakeholder records associated with the specific stakeholder record. Additionally, stakeholder record schemas for stakeholders 1008c may be present within stakeholder container 1008, in some embodiments.

Figure 11:
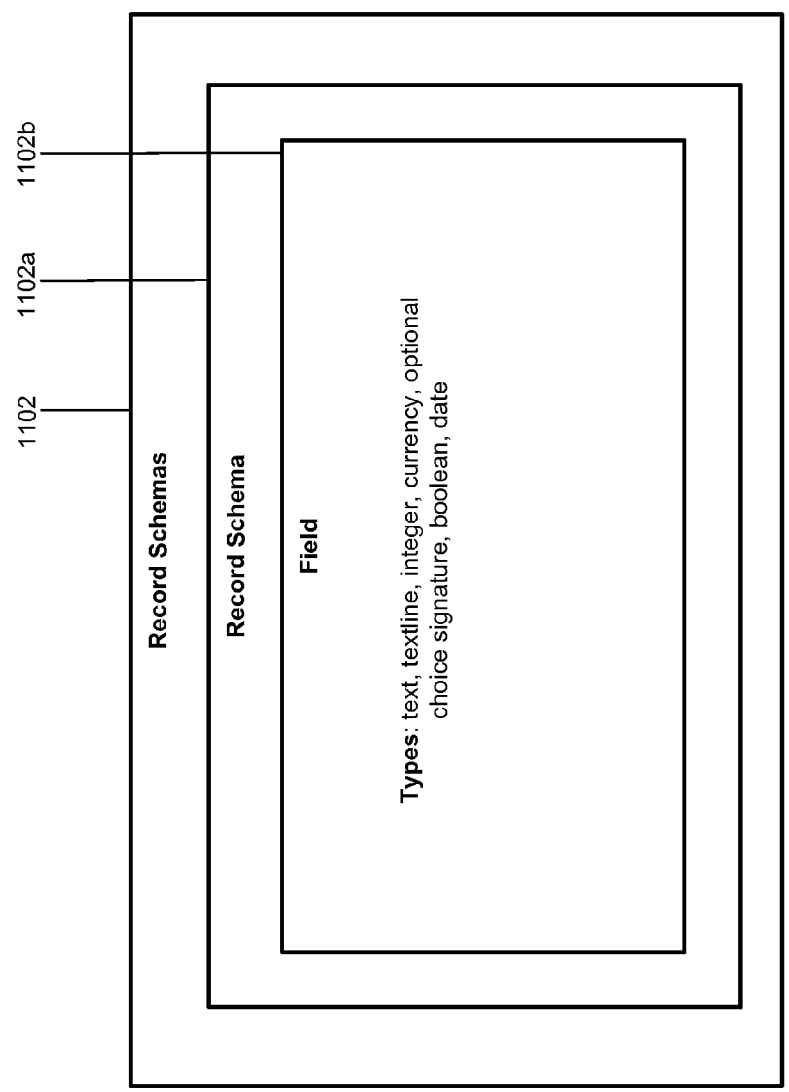
FIG. 11 is a schematic diagram of a record schema, in accordance with some embodiments.

FIG. 11 is a schematic diagram of a record schema, in accordance with some embodiments. Record schemas 1102 includes a specific record schema 1102a, which includes a set of fields 1102b, each having a type, which may include one of the following: text, textline, integer, currency, optional choice, signature, boolean, and date, or another type. Record schema 1102a does not contain any operational data pertaining to a document, a stakeholder, or to a corporate entity.

Figure 12:
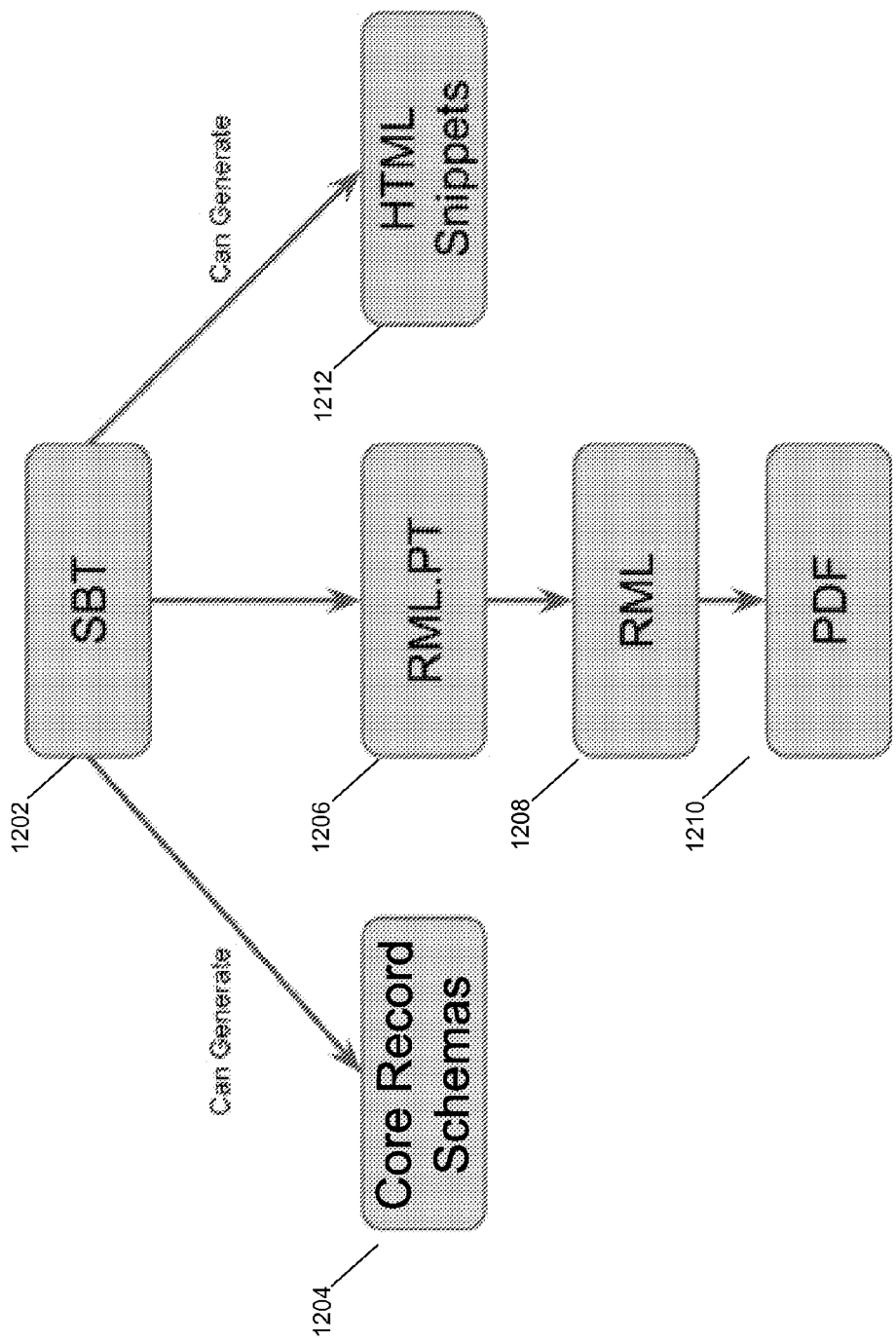
FIG. 12 is a schematic diagram of a document templating architecture, in accordance with some embodiments.

FIG. 12 is a schematic diagram of a document templating architecture, in accordance with some embodiments. Shoobx template (SBT) file 1202 can generate a metadata schema 1204 or an HTML snippet 1212. SBT file 1202 is dependent on the document model described herein, and includes extensions to report markup language (RML) for handling terms and sections of documents. Metadata schemas 1204 define the input needed to generate a given document. HTML snippets 1212 can be used to drive help text, or to drive a paragraph-level preview of the document, or to render all or part of the document into HTML. In addition, SBT file 1202 can be translated to an RML page template file 1206 containing business logic and/or executable instructions, which can be translated to a static RML file 108, which can be used to generate a static PDF file 1210. In some embodiments, an RML translation engine, such as ReportLab, may be used to translate RML to PDF. In some embodiments, the RML translation engine may be used to translate RML to HTML.

Figure 13:
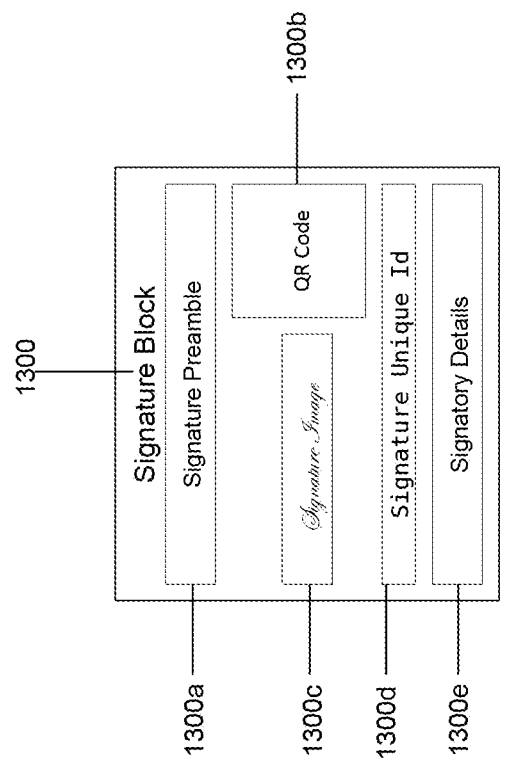
FIG. 13 is a schematic diagram of components of a signature, in accordance with some embodiments.

FIG. 13 is a schematic diagram of components of a signature, in accordance with some embodiments. Signature block 1300 may appear visually on a document generated by the system. Signature preamble 1300a may contain basic language, such as the words "Signed," or "Executed by," or other language that may serve as a preamble. Signature image 1300c, QR code 1300b, and signature unique ID 1300d together comprise identifying information initiated by a signing user, e.g., the legally-binding signature. Signatory details 1300e may be a text block describing the identity of the signer and the authority held by the signer, e.g., "John Smith, President." Signatory details 1300e may be derived automatically from the stakeholder's name and role.

In some embodiments, when a user elects to sign a document, a user consents to apply his or her prior-assigned signature image 1300c to the document, and at that time a signature unique ID is generated. Since the signature unique ID is uniquely associated with the particular signature assigned to this document, the exact document and page of the document may be retrieved by looking up the signature unique ID, even when a large number of documents is present on the system. QR code 1300b is a visual representation of signature unique ID 1300d, in some embodiments, for rapid search and retrieval of the signature database based on the signature unique ID. In some embodiments, not every element in signature block 1300 may be used by the system as the standard signature block.

Figure 14:
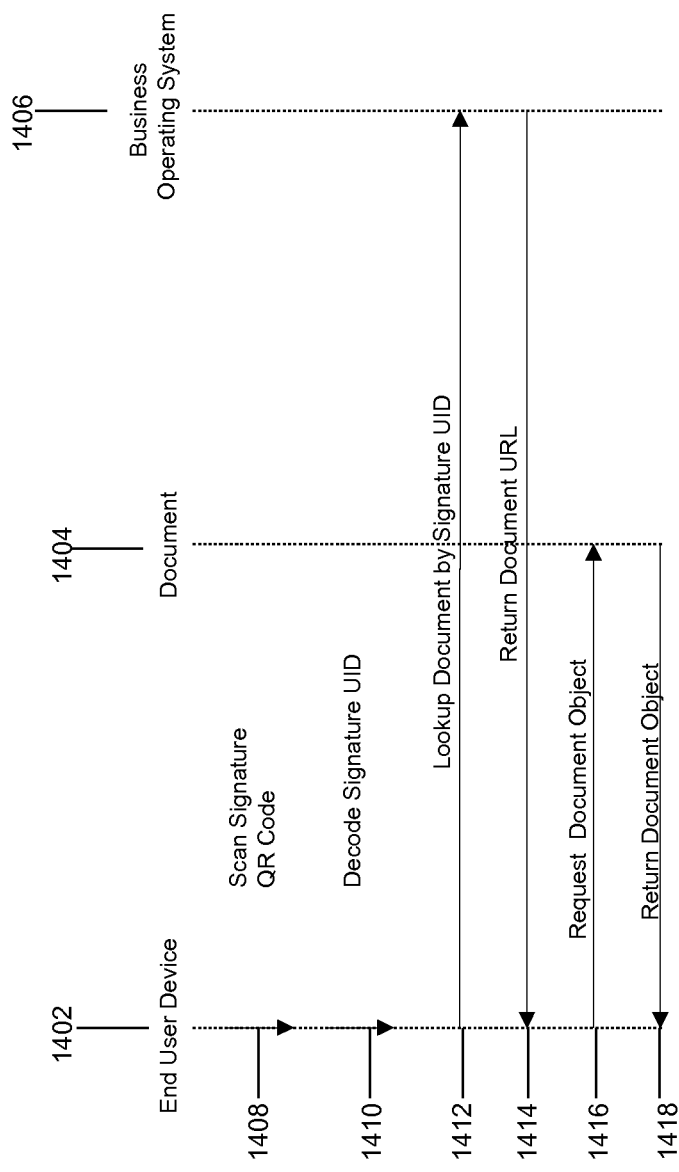
FIG. 14 is a schematic diagram of document lookup via signature QR codes, in accordance with some embodiments.

FIG. 14 is a schematic diagram of document lookup via signature QR codes, in accordance with some embodiments. At step 1408, a QR code of a signature is scanned at end user device 1402. At step 1410, the end user device 1402 decodes the signature UID from the QR code. At step 1412, the signature UID is sent to the business operating system 1406 itself. The document has not yet been identified and is bypassed. At step 1414, the system returns a document URL. At step 1416, the user's device may now directly request document data from document 1404, and at step 1418, data is received at the end user device 1402 for the specific document 1404.

Figure 15:
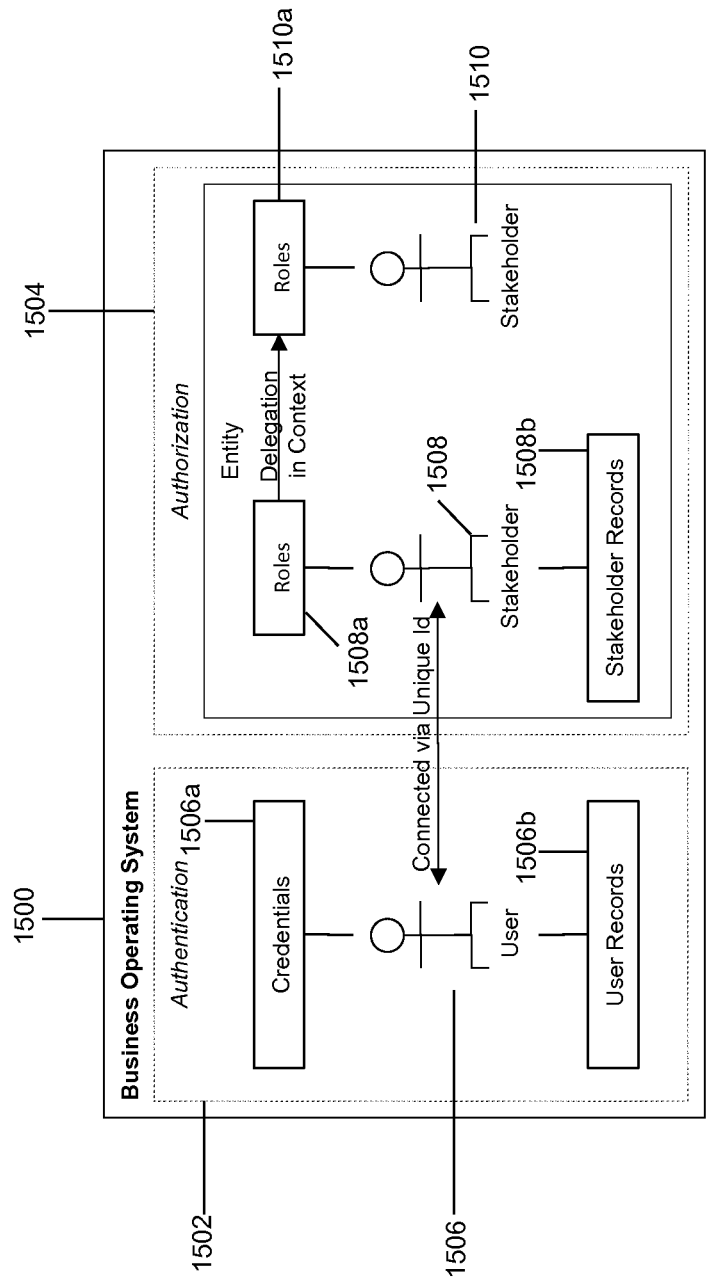
FIG. 15 is a schematic diagram of users and stakeholders and their security roles, in accordance with some embodiments.

FIG. 15 is a schematic diagram of users and stakeholders and their security roles, in accordance with some embodiments. Business operating system 1500 includes an authentication module 1502 and an authorization 1504. Authentication module 1502 is for identification of the user, e.g., is the user who he or she claims to be? Authentication module 1502 includes credentials 1506a and user records 1506b for user 1506. Authorization module 1504 is for determining whether the specific user should be permitted to take a specific action, e.g., has the user been assigned the capability to perform this action? All records for the authorization module relate to at least one specific entity 1504a; additional entities are not shown but may be present. Stakeholder roles 1508a and stakeholder records 1508b are associated with stakeholder 1508. Additionally, stakeholder 1508 may have received delegated roles 1510a from stakeholder 1510. Authorization module 1504 also may determine what information the user has access to in the system. Authorization module 1504 may use roles to determine what information, actions, or capabilities the user has access to.

In operation, user 1506 may present his or her credentials to the system, which are matched against credentials 1506a to verify the user's identity at authentication module 1502. In some embodiments, two-factor or multi-factor authentication may be used. Once the user has authenticated, the user records 1506b are retrieved by the system and all entities for which the user is a stakeholder are retrieved by the system as well, using the unique IDs for each user-stakeholder pair. Next, each user-stakeholder pair is evaluated for its roles 1508a, 1510a to determine whether a certain task is permissible. As each role includes permissions for many different actions and access to various information, role may be thought of as a keychain, containing many keys. In some embodiments, a context of the user on the system is taken into account in addition to roles (e.g., additional capabilities may be granted to a human resources user when the actions are performed on or from a human resources landing page, sub-site, or section of the user interface).

Figure 16:
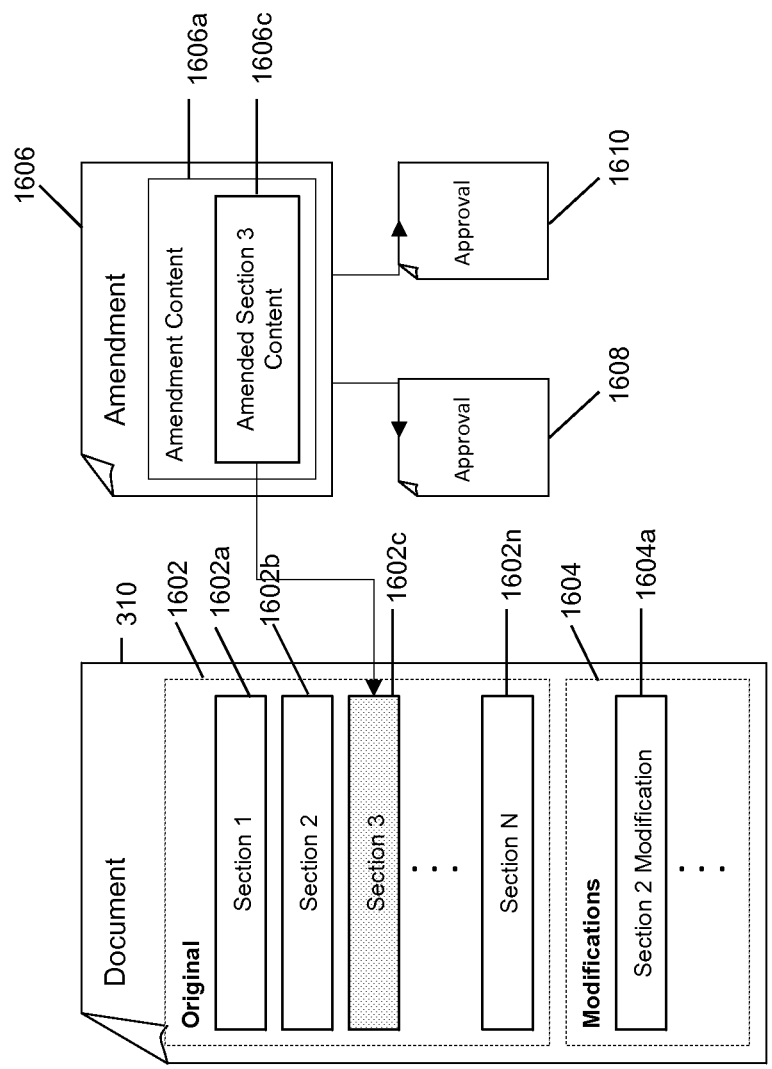
FIG. 16 is a schematic diagram of components involved in modifying and/or amending a document, in accordance with some embodiments.

FIG. 16 is a schematic diagram of components involved in modifying and amending a document, in accordance with some embodiments. Document 310 includes original portion 1602, which itself includes sections 1602a, 1602b, 1602c . . . 1602n. Modifications are also stored with the document 1604, and in FIG. 16 modification has already been made to section 2, 1604a. A new amendment 1606 is being presented, with content 1606a, which includes amended section 3 content 1606c. Approvals 1608 and 1610 are needed to approve the amendment.

In operation, the original content 1602 of document 310 does not change, even when the document is subject to one or more amendments. This may be displayed in the user interface as an overlay or sidebar, indicating that the document has been modified but not presenting the modifications as part of the original document. Modification of section 3 may be generated by a process that generates amendments, which may be limited to specific changes of core values stored in the document, or specific changes such as complete cancellation; or which may include the ability to amend any and all terms arbitrarily (e.g., rewrite the section completely). Approvals 1608 and 1610 may be initiated and requested within the system. For example, if a document indicates that approvals are needed, the system will identify the users to whom approvals should be sent and will block the amending user from going forward until the approvals have been received. Once approvals have been received, amended section 3 content 1606c may be saved into document modifications 1604, and may be linked to section 3 in the way that section 2 modification 1604a is linked to section 2 of the original document.

Figure 17:
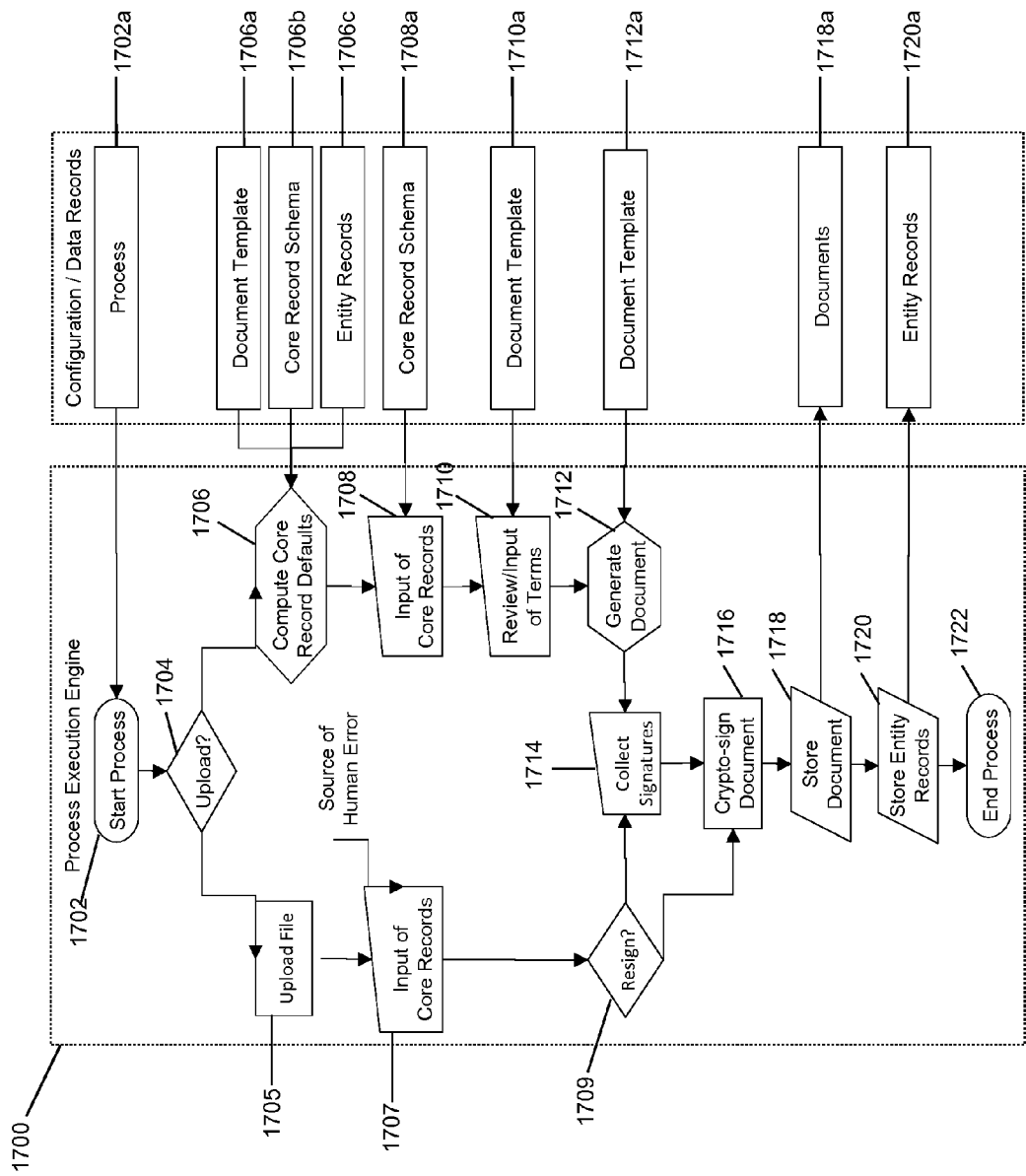
FIG. 17 is a flowchart of a process that generates a document, in accordance with some embodiments.

FIG. 17 is a flowchart of a process that generates a document, in accordance with some embodiments. At step 1702, a process starts, taking into account a process, stored at process store 1702a. Here, a generic corporate agreement process is illustrated. At step 1704, the user is requested to indicate whether or not a nonstandard document will be uploaded by the user. If the document is nonstandard, the user may upload it at step 1705, but the user must input core records manually at step 1707, which is a source of human error. The system may ask whether or not the uploaded document needs to be signed or re-signed, at which point the system either collects signatures at step 1714 or signs the document cryptographically at step 1716.

If no upload is selected at step 1704, the system may then apply document template 1706a, core record schema 1706b, and entity records 1706c to compute core records for the new document. At step 1708, manual values for any additional core records that do not have default values are requested, based on the list of core records in the core record schema 1708a. At step 1710, the core records may be combined with the document template stored at document template store 1710a to generate a human-readable document that the user may be invited to review. At step 1712, following user review, the document may be generated, again with reference as needed to document template 1712a. At steps 1714 and 1716, the system will collect signatures and sign the document.

After the document has been cryptographically signed, the document can no longer be modified. The document may be stored, at step 1718, in document store 1718a. Typically a document will contain core records that will change values stored in the entity record, so those changes are also saved at step 1720, in entity records store 1720a. At step 1722, execution stops.

Figure 18:
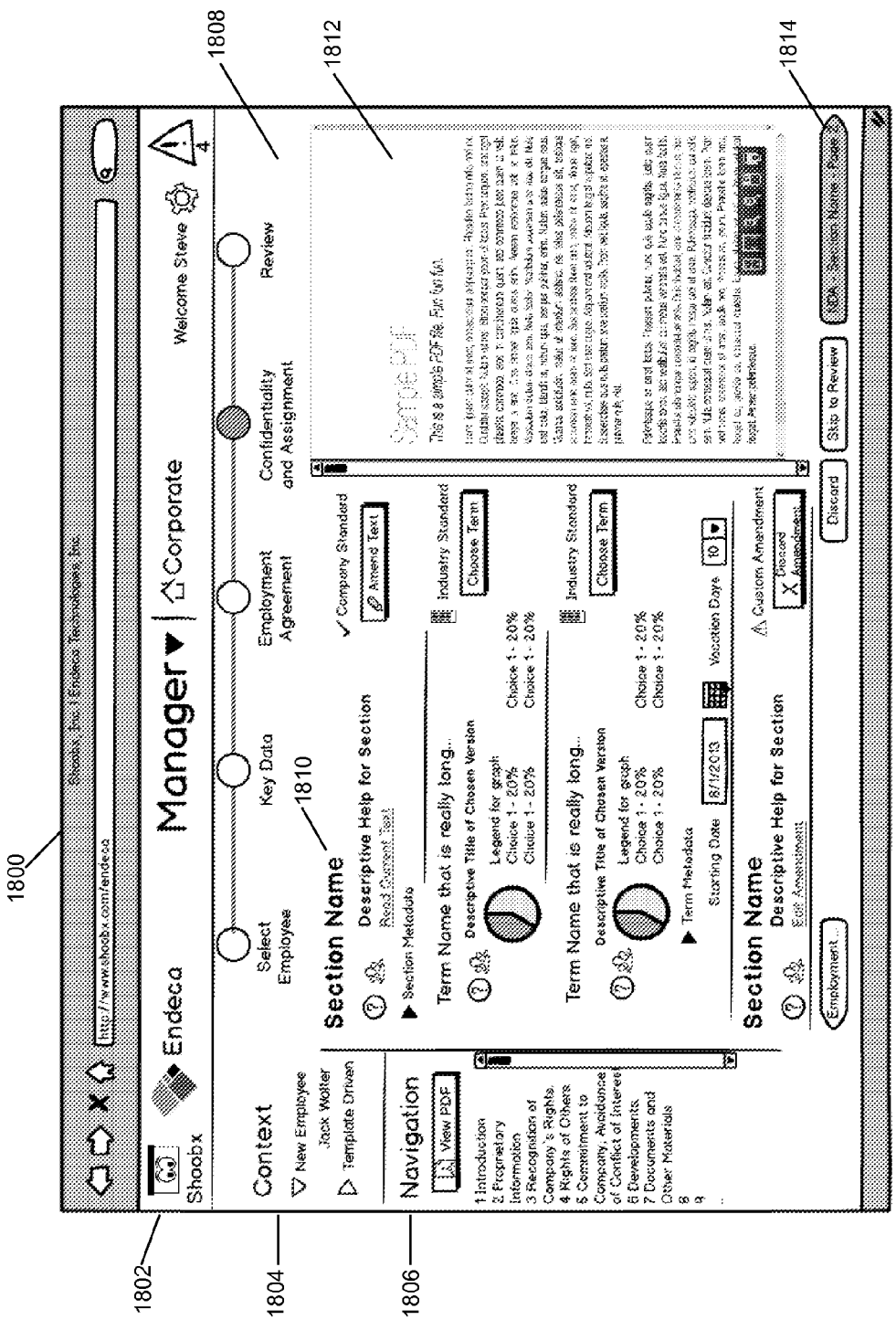
FIG. 18 is a wireframe diagram of a terms selection page for a particular section of a document featuring analytics-based decision support, in accordance with some embodiments.

FIG. 18 is a wireframe diagram of a terms selection page for a particular section of a document, in accordance with some embodiments. Terms selection page 1800 includes header portion 1802, contextual navigation control 1804, document navigation control 1806, process navigation indicator 1808, detailed content area 1810, PDF display area 1812, and process navigation control buttons 1814. As shown, a corporate manager is in the middle of a business process for adding an employee, where the process includes both creation of an employment agreement and a confidentiality agreement; this macro view of the process is shown in process navigation indicator 1808. Certain controls relating to the role of the logged-in user/stakeholder are shown in header portion 1802, and may change based on the selection by the user of a specific role and entity. Contextual navigation control 1804 indicates certain information relating to the current process, either from prior data entry or from the system, that may be helpful for understanding the specific process being executed. Document navigation control 1806 provides a list of headers in a document. A user may make edits to document terms in the main section, detailed content area 1810, such as electing an industry standard term, a starting date or a number of vacation days, among other parameters; key data requests from the system may appear in this area. Navigation control buttons 1814 move forward or backward in a template-based or wizard-based process, or serve to return the user to another screen where he or she can select tasks. In some embodiments, different visual indicators and controls may be provided, and the specific user interface elements depicted in FIG. 18 need not all be present for every embodiment.

FIG. 19 is a schematic diagram of an example report card for a non-disclosure agreement, in accordance with some embodiments. As described above, a report card may provide a quick assessment of whether a document contains valid and actionable information about the corporate entity. Here, report card 1900 includes: a title 1902 that indicates the type of document being described; a confidence indicator 1904 derived from evaluation of a number of factors; an action audit list 1906 showing the dates of all changes made by all users to the document; a document term summary 1908 summarizing the document; and detailed information 1910 about core records in the document ("Key Data Information").

Detailed information 1910 may include sections pertaining to the document type itself 1910a, here, to a non-disclosure agreement; to the corporate entity 1910b; to the document terms 1910c; and to any additional core records in the document 1910d, here, the counterparty ("discloser address"). The detailed information may include the value stored in the document for each core record, and notably, the value source for each value, enabling a user or auditor to ensure that all values were derived properly and/or were not erroneously entered using manual data entry.

Alternatives

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smartphone or any other suitable portable or fixed electronic device.

A computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or any other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A system for organizing, managing, and reporting data relating to a corporate entity, comprising:

at least one database configured to store a document record and a core record, the document record relating to a corporate action, the core record stored with the document record;

a business logic module, coupled to the at least one database; and at least one document template stored in the at least one database and comprising instructions for generating, at the business logic module, a document based on the core record, the core record further comprising a value reflecting human-readable information for incorporation into the generated document, the core record further comprising a provenance of the value for allowing the business logic module to assess validity of the value at a given time by evaluating where the value was originated, wherein the provenance of the value reflects either manual entry or refers to another document based on another core record, the value of the core record matching a value of the another core record, and the provenance reflecting a chain of documents that together reflect a canonical state of the corporate entity and a history of states of the corporate entity, the business logic module thereby enabling the system to verifiably generate documents that reflect the canonical state of the corporate entity.

2. The system of claim 1, wherein the provenance is a source document object or an indication that the value was manually entered by a stakeholder.

3. The system of claim 1, further comprising a user interface coupled to the business logic module for displaying the generated document to a user for signature.

4. The system of claim 1, wherein the at least one database is configured to store an entity object, the entity object further comprising a set of entity records with each entity record of the set of entity records comprising a value and a provenance of the value, wherein at least one entity record of the set of entity records comprises a provenance that is the document object relating to the corporate action.

5. The system of claim 1, further comprising a plurality of processors coupled to a database over a network.

6. The system of claim 1, further comprising an authentication module and an electronic signature manager configured to insert signatures into generated documents.

7. The system of claim 1, further comprising a retrieval module configured to accept a signature unique identifier or quick response (QR) code related to a signature on a previously-executed document for retrieving the stored document.

8. The system of claim 1, further comprising a delegation manager configured to perform authorization to perform an action in the system using one or more of permissions, roles, principals or groups, and configured to permit principals to delegate a permission or role to another principal in the context of a particular entity, document, or process.

9. The system of claim 1, further comprising a user interface coupled to the business logic module, wherein the user interface is configured to display available stakeholder capabilities, the stakeholder capabilities enabling a user to modify an entity record through a process.

10. The system of claim 1, wherein the generated document may be a portable document format (PDF) document.

11. The system of claim 1, wherein the business logic module is configured to retrieve, for a given entity record, a prior-generated document storing a core record referenced by the given entity record and with an active status stored in a tag of the prior-generated document.

12. A method for organizing, managing, and reporting data relating to a corporate entity, comprising:
- retrieving an entity record comprising a value and a lineage entry, the lineage entry comprising a value source, the value source referencing a first document;
- retrieving a corporate action stored as a computer-readable process definition;
- creating a core record for a second document based on at least one of the entity record, a stakeholder record, or manual input; and
- generating the second document using the core record and a document template,
- wherein the value source of the value references the first document, the value of the core record matches a value of another core record of the first document, and the core record for the second document reflects a chain of documents that together reflect a canonical state of the corporate entity and a history of states of the corporate entity.

13. The method of claim 12, further comprising:
- retrieving a permissibility rule associated with a corporate action and an active stakeholder role; and
- determining, based on the permissibility rule and the stakeholder role, whether a stakeholder is authorized to perform the corporate action.

14. The method of claim 12, further comprising:
- storing an active document status with the second document; and
- retrieving a set of documents that includes the second document in response to a query for all active documents,
- thereby enabling a user to retrieve documents that reflect a present state of the entity.

15. The method of claim 12, further comprising:
- retrieving an updated value from a new core record within the second document;
- updating the entity record with the updated value; and
- adding, to the entity record, a new lineage entry with a value source referencing the second document,
- thereby preserving the first document without modification.

16. The method of claim 12, wherein the first document is a certificate of incorporation, and the first core record is a corporation name referenced in the certificate of incorporation.

17. The method of claim 12, wherein the second document is one of a board resolution, a shareholder consent, a shareholder communication, and a stock plan.

18. The method of claim 14, wherein the first document is a certificate of incorporation, and the second document is an amendment to the certificate of incorporation.

19. A system, comprising:
- a processor for performing data storage and retrieval operations;
- a database coupled to the processor; and
- a storage medium comprising instructions which, when executed by the processor, performs steps comprising:
  - retrieving an entity record comprising a value and a lineage entry, the lineage entry comprising a value source, the value source referencing a first document;
  - retrieving a corporate action stored as a computer-readable process definition;
  - creating a core record for a second document based on at least one of the entity record, a stakeholder record, or manual input; and
  - generating the second document using the core record and a document template,
  - wherein the value source of the value references the first document, the value of the core record matches a value of another core record of the first document, and the core record for the second document reflects a chain of documents that together reflect a canonical state of the corporate entity and a history of states of the corporate entity.

\* \* \* \* \*